US007009734B2

(12) United States Patent
Suwa et al.

(10) Patent No.: US 7,009,734 B2
(45) Date of Patent: Mar. 7, 2006

(54) METHOD AND APPARATUS FOR FORMING COLOR TRANSFORM LOOKUP TABLE, AND IMAGE PROCESSING METHOD

(75) Inventors: Tetsuya Suwa, Kanagawa (JP); Shigeyasu Nagoshi, Kanagawa (JP); Okinori Tsuchiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 856 days.

(21) Appl. No.: 09/931,055

(22) Filed: Aug. 17, 2001

(65) Prior Publication Data
US 2002/0048031 A1    Apr. 25, 2002

(30) Foreign Application Priority Data

Aug. 22, 2000  (JP)  .............................. 2000-251294
Aug. 29, 2000  (JP)  .............................. 2000-259125

(51) Int. Cl.
G06F 15/00   (2006.01)

(52) U.S. Cl. ....................... 358/1.9; 358/525; 358/518; 345/604; 345/601; 345/602; 708/290; 382/300; 382/167

(58) Field of Classification Search ................. 358/1.9, 358/523, 525, 518, 591; 345/589, 604, 601, 345/602; 708/290; 382/300, 167; 348/273
See application file for complete search history.

(56) References Cited

U.S. PATENT DOCUMENTS

| 5,475,510 | A | * | 12/1995 | Ikegami ....................... 358/525 |
| 5,504,821 | A | * | 4/1996 | Kanamori et al. ........... 382/167 |
| 5,508,827 | A | * | 4/1996 | Po-Chieh ..................... 358/518 |
| 5,880,738 | A |   | 3/1999 | Donelly ....................... 345/431 |
| 5,982,990 | A | * | 11/1999 | Gondek ........................ 358/1.9 |
| 6,335,734 | B1 | * | 1/2002 | Nagae et al. ................ 345/589 |
| 6,335,800 | B1 | * | 1/2002 | Balasubramanian ........ 358/1.9 |
| 6,836,572 | B1 | * | 12/2004 | Ishiga et al. ................. 382/300 |
| 6,933,970 | B1 | * | 8/2005 | Koshiba et al. ............. 348/273 |

FOREIGN PATENT DOCUMENTS

JP    11-004356    1/1999

* cited by examiner

*Primary Examiner*—Kimberly Williams
*Assistant Examiner*—Beniyam Menberu
(74) *Attorney, Agent, or Firm*—Fitzpatrick, Cella, Harper & Scinto

(57) ABSTRACT

Disclosed are a method and apparatus for forming a color transform lookup table which helps output a smooth image having no pseudo contour and excellent in granularity. On the basis of a previously formed table, a color space is expressed by a basic triangle of white-primary color-black, and output signal values corresponding to lattice points in this basic triangle are calculated by linear interpolation. Black ink and cyan ink are replaced by setting a straight line AB, as a boundary line, connecting two points immediately before black ink begins to be introduced on two sides of the basic triangle.

12 Claims, 34 Drawing Sheets

FIG. 1

| (R, G, B) | (C, M, Y, K) |
|---|---|
| (0, 0, 0) | (0, 0, 0, 255) |
| (0, 0, 16) | (18, 16, 0, 246) |
| (0, 0, 32) | (33, 31, 0, 224) |
| ⋮ | ⋮ |
| ⋮ | ⋮ |
| (255, 255, 240) | (0, 0, 15, 0) |
| (255, 255, 255) | (0, 0, 0, 0) |

FIG. 15

WHITE                                                                                                                    CYAN
(0)—(0)—(0)—(0)—(15)—(24)—(60)—(96)—(128)(144)(160)(176)(192)(208)(224)(240)(255)
(0)—(17)—(34)—(51)—(68)—(85)(102)(119)(136)(153)(170)(187)(204)(221)(235)(255)
F   (0)—(18)—(35)—(55)—(73)—(91)(109)(128)(146)(164)(182)(200)(219)(237)(255)
(0)—(20)—(39)—(59)—(78)—(98)(118)(137)(157)(177)(196)(216)(235)(255)
(12)—(32)—(53)—(73)—(93)(113)(134)(154)(174)(194)(215)(235)(255)
(38)—(58)—(77)—(97)(117)(137)(156)(176)(196)(216)(235)(255)
(72)—(90)(109)(127)(145)(164)(182)(200)(218)(237)(255)
(102)(119)(136)(153)(170)(187)(204)(221)(238)(255)
(132)(147)(153)(178)(194)(209)(224)(240)(255)
(162)(175)(189)(202)(215)(228)(242)(255)
(180)(193)(205)(218)(230)(243)(255)
(198)(200)(203)(205)(208)(210)
(220)(207)(194)(181)(168)
(180)(162)(144)(126)
(120)(102)(84)
(50)—(42)
(0)
BLACK

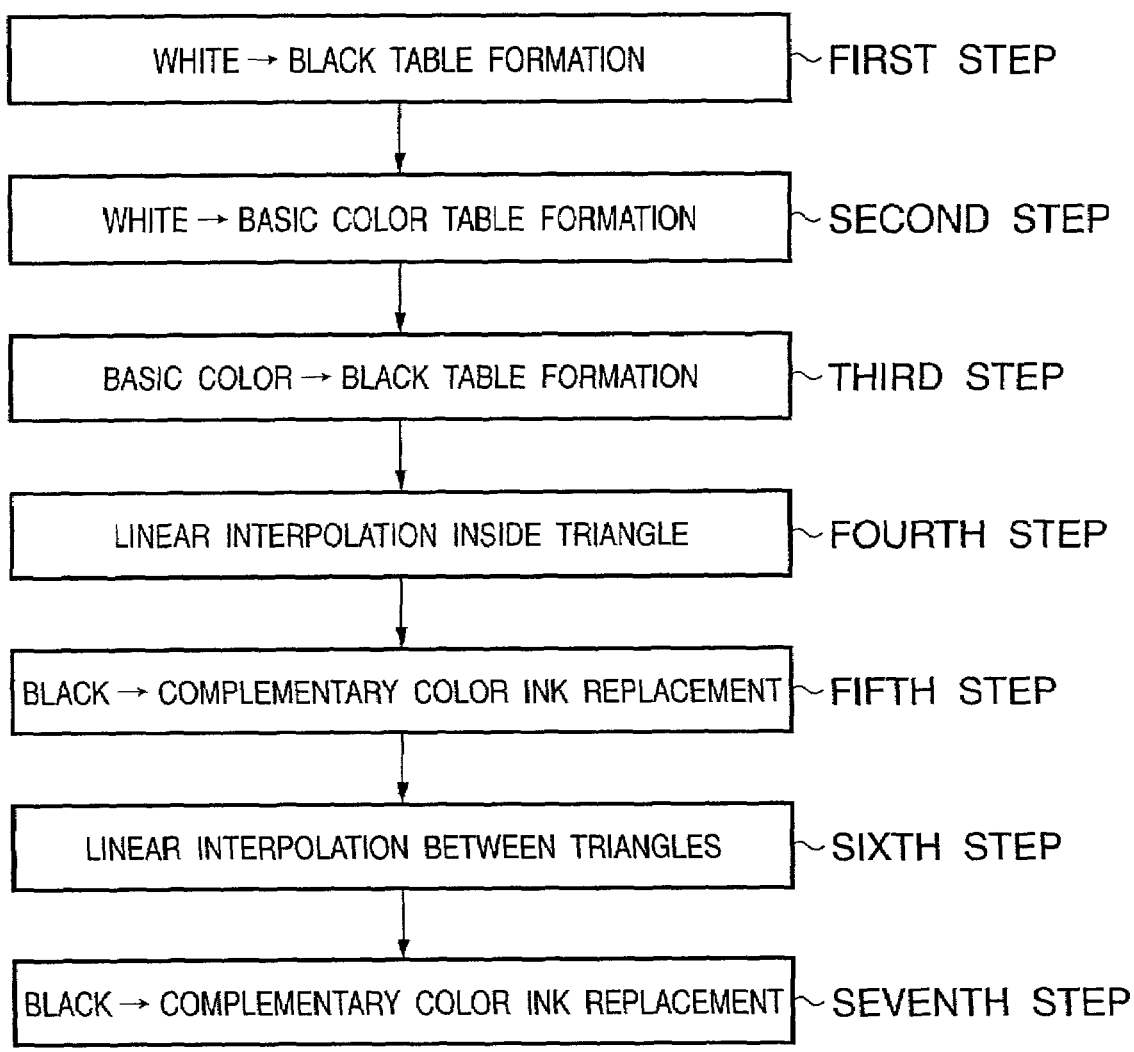

WHITE → BLACK

CYAN, MAGENTA, YELLOW → BLACK

RED, GREEN → BLACK

BLUE → BLACK

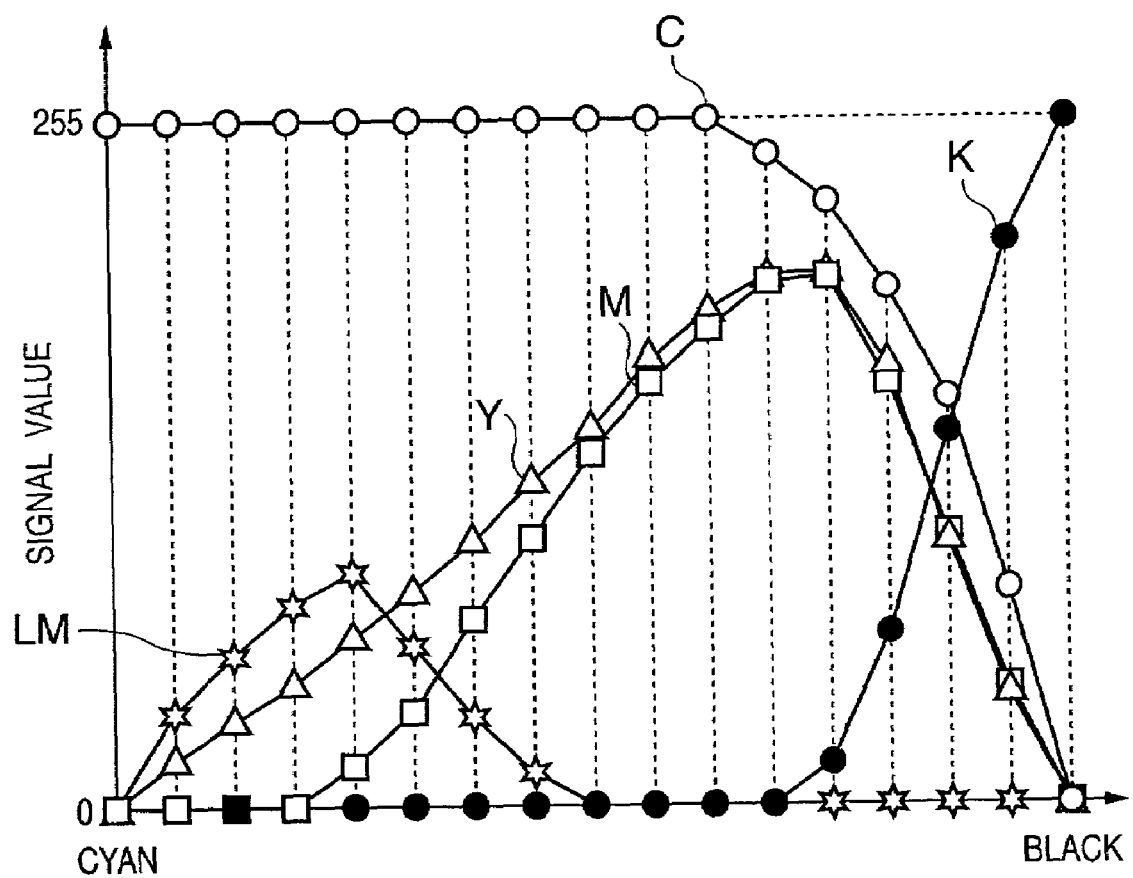
F I G. 31

FIG. 34

WHITE
```
                                                                                          CYAN
(0)—(0)—(0)—(0)—(16)—(24)—(60)—(96)—(128)(144)(160)(176)(192)(208)(224)(240)(255)
 |    |    |    |    |    |    |    |    |    |    |    |    |    |    |    |   /
(0)—(0)—(0)—(15)—(27)—(62)—(97)—(129)(146)(162)(178)(193)(208)(222)(237)(255)
 |    |    |    |    |    |    |    |    |    |    |    |    |    |    |   /
(0)—(0)—(14)—(30)—(54)—(98)—(129)(148)(164)(180)(193)(207)(221)(234)(255)
 |    |    |    |    |    |    |    |    |    |    |    |    |    |   /
(0)—(13)—(32)—(66)—(99)—(130)(150)(166)(182)(194)(207)(219)(231)(255)
 |    |    |    |    |    |    |    |    |    |    |    |    |   /
(12)—(35)—(68)—(99)—(130)(152)(168)(184)(195)(206)(217)(228)(255)
 |    |    |    |    |    |    |    |    |    |    |    |   /
(38)—(70)—(100)(131)(154)(170)(186)(196)(206)(215)(225)(255)
 |    |    |    |    |    |    |    |    |    |    |   /
(72)—(101)(131)(156)(172)(188)(196)(205)(214)(223)(255)
 |    |    |    |    |    |    |    |    |    |   /
(102)(132)(158)(174)(190)(197)(205)(212)(220)(255)
 |    |    |    |    |    |    |    |    |   /
(132)(160)(176)(192)(198)(204)(210)(217)(255)
 |    |    |    |    |    |    |    |   /
(162)(178)(194)(199)(204)(208)(214)(255)
 |    |    |    |    |    |    |   /
(180)(196)(199)(203)(207)(211)(255)
 |    |    |    |    |    |   /
(198)(200)(203)(205)(208)(210)
 |    |    |    |    |   /
(220)(207)(194)(181)(168)
 |    |    |    |   /
(180)(162)(144)(125)
 |    |    |   /
(120)(102)—(84)
 |    |   /
(60)—(42)
 |   /
(0)
```
BLACK

METHOD AND APPARATUS FOR FORMING COLOR TRANSFORM LOOKUP TABLE, AND IMAGE PROCESSING METHOD

FIELD OF THE INVENTION

The present invention relates to a method and apparatus for forming a color transform lookup table which is looked up when additive mixture image data is to be transformed into subtractive mixture image data such that the color appearance of an image formed on a printing medium is substantially equal to that of an image formed on a monitor, an image processing method, and a recording medium.

BACKGROUND OF THE INVENTION

An image processing system for printing and the like generally includes a host computer for forming and outputting print data to be printed, and a printing apparatus which prints an image (color image) of a plurality of colors on a printing medium such as a printing sheet of paper in accordance with input print data from the host computer. In this image processing system, the host computer processes image data by three primary colors R (red), G (green), and B (blue), because the computer performs interactive processing with an operator by using a display. On the other hand, the printing apparatus prints data on a printing medium by ink colors C (cyan), M (magenta), Y (yellow), and K (black), so the apparatus usually processes image data by these four colors CMYK.

An inkjet printing apparatus as one printing apparatus sometimes uses cyan (light cyan, to be referred to as LC hereinafter) and magenta (light magenta, to be referred to as LM hereinafter) having lower density than common inks, in addition to the four types of inks described above. This is so because an inkjet printing apparatus prints data by spraying slight amounts of inks onto the surface of paper, and so dots of the sprayed inks are visible in a high-lightness portion close to white. Examples of a method of improving this drawback are to decrease dot diameters on a printing surface by reducing amounts of sprayed inks, and to make dots difficult to recognize by decreasing the dye concentrations of inks. As the latter method, LC and LM inks having low density are presently often used together with C and M inks which tend to produce considerable granularity. This greatly improves the granularity.

To this end, RGB values depending on a display must be transformed into printing colors such as CMYK unique to a printing apparatus. Various methods have been proposed as a method of this color transform. One is a method called direct mapping. In this method, CMYK values described in a lookup table (to be referred to as a "color transform LUT" or simply as a "LUT" hereinafter) prepared beforehand are directly referred to in accordance with input RGB values. The use of this method makes nonlinear transform or complicated transform possible, and this makes finer image design feasible.

Since color transform is generally three- or four-dimensional transform, an enormous memory capacity is necessary if output values corresponding to all input values are described in a color transform LUT. Also, the formation of such a color transform LUT is time-consuming and impractical. For example, when each value of input RGB has 8 bits and each value of output CMYK has 8 bits, the size of a color transform LUT describing the correspondence of all combinations is approximately 2 gigabytes. Additionally, CMYK values corresponding to about 16,700,000 input RGB values must be found, so the formation of this color transform LUT requires much labor.

To save the memory capacity and simplify the formation of a color transform LUT, therefore, the general approach is to use a color transform LUT interpolation method. In this method, an input color space is divided into appropriate unit solids. Input/output relationships are stored as a color transform LUT only on coarse lattice points, and values between these coarse lattice points are calculated by an interpolating operation. For example, a color space is divided into tetrahedrons, pyramids, or cubes, and each axis is generally divided into 8 to 32 portions.

FIG. 1 shows an example of a color transform LUT. In this LUT, each of RGB axes is divided into 16 portions. The LUT begins with black (R, G, B)=(0, 0, 0), loops 16 times in the order of B, G, and R, and ends with white (R, G, B)=(255, 255, 255). Corresponding values (signal values) represent cyan (C), magenta (M), yellow (Y), and black (K) in this order from the left. The following description is based on this color transform LUT in which each of RGB axes are thus divided into 16 portions.

FIG. 2 is a graph showing an example of the correspondence between input RGB signal values and output CMYK signal values of only a gray line, from white (R, G, B)=(255, 255, 255) to black (R, G, B)=(0,0,0), extracted from a color transform LUT of an inkjet printing apparatus which prints data by using four types of inks (C, M, Y, and K). This graph shows that data is printed by three types of inks, cyan (C), magenta (M), and yellow (Y), from white (R, G, B)=(255, 255, 255) to a lattice point (R, G, B)=(96, 96, 96), that these inks are gradually replaced with black ink from (R, G, B)=(96, 96, 96), and that only black ink (K) is used at (R, G, B)=(0, 0, 0).

FIG. 3 is a graph showing an example of the correspondence between input RGB signal values and output CMYK signal values of only a gray line extracted from a color transform LUT of an inkjet printing apparatus which prints data by using six types of inks (C, Y, K, LC, and LM). This graph shows that data is printed by three types of inks, Y, LC, and LM, from white R=G=B=255 to a lattice point R=G=B=208. From R=G=B=208, inks C, M, and Y are introduced and inks Y, LC, and LM are reduced. From R=G=B=64, K ink is introduced and C, M, and Y inks are reduced. Finally, only the ink K is used at R=G=B=0.

The purposes of these processes are to reduce the granularity of a printed image. An inkjet printer prints data by spraying slight amounts of inks onto the surface of a printing sheet. Therefore, dots of the sprayed inks are discernible in a high-lightness portion close to white, and this worsens the granularity. Examples of a method of improving this drawback are to decrease dot diameters on a printing surface by reducing amounts of sprayed inks, and to make dots difficult to recognize by decreasing the dye concentrations of inks. In the gray line shown in FIG. 2, ink amounts are increased by using C, M, and Y inks without using K ink in a high-lightness portion, thereby reducing low-frequency components of the spatial frequency and improving the granularity. In the gray line shown in FIG. 3, the granularity is improved by using LC and LM inks without using C, M, and K inks in a high-lightness portion. Since the ink amounts used increase, however, inks blot on the surface of a printing sheet, and the ink consumption amount increases. These drawbacks have a tradeoff relationship with the granularity.

FIG. 4 is a graph showing an example of the correspondence between input RBG signal values and output CMYK signal values on a line from red (R, G, B)=(255, 0, 0) to black (R, G, B)=(0, 0, 0) in a color transform LUT. As shown in FIG. 4, data is generally printed by initially using cyan ink (C) as a complementary color to red and then using black ink (K). With this method, the granularity can be reduced similar to the gray line from white to black.

Although there are problems of ink blot and an increase in the ink consumption amount as described above, a difference from the gray line from white to black is that the size of color space also changes. As shown in FIG. 5 which is a view of projection onto an a*-b* plane, the color reproduction region of colors generated on a printing sheet by subtractive mixture largely differs from that of colors generated on a monitor (display) by additive mixture. An apparatus such as an inkjet printer which prints hard copies is largely inferior to a monitor in color generation. Hence, data is preferably printed by increasing the color reproduction region as large as possible, since the image becomes close to a monitor image.

FIG. 6 is a graph showing an example of the correspondence between input RGB signal values and output CMYK signal values on a line from red to black in a color transform LUT, when only black ink (K) is used without using any complementary color ink.

FIG. 7 shows a color reproduction region when only black ink (K) is used without using any complementary color ink as shown in FIG. 6, and a color reproduction region when complementary color ink and black ink (K) are used together as shown in FIG. 4. As FIG. 7 illustrates, the color reproduction region is larger when only black ink (K) is used. This is so because black ink can reduce lightness (L*) with a smaller ink amount. When cyan (C) is used jointly, the whole ink printing amount increases, and this reduces the saturation component. That is, the use of black ink (K) on a line from color to black results in a tradeoff relationship: the color reproduction region can be increased although the granularity increases.

Also, since cyan, magenta, yellow, red, green, and blue (to be referred to as "primary colors" hereinafter) are different in lightness and saturation, they are also different in granularity when black ink (K) is used. For example, of these six primary colors, blue having the lowest lightness produces no granularity even when no complementary color is used. In contrast, when yellow having the highest lightness is used, no black ink is preferably used because this eliminates the granularity. Accordingly, better images can be obtained by changing the start point of use of black ink in accordance with each color.

A color transform LUT is formed by taking account of the relationship between the granularity, color reproduction region, and ink consumption amount explained above. A method of forming this color transform LUT will be described below.

A color space of white, black, and a primary color is expressed by a triangle, as shown in FIG. 8, having white, the primary color, and black as apexes A, B, and C, respectively. First, sides AC and BC of the primary color are formed. As signal values from white (R, G, B)=(255, 255, 255) to the primary color, a desired density and lightness can be recorded by recording and measuring a patch. Since this determines a side AB in FIG. 8, all output signal values on the individual sides of this triangle are obtained. A color transform LUT is formed by dividing this color space into small color spaces and storing output signal values corresponding to individual lattice points. Points except for these lattice points are obtained by an interpolating operation.

A method of interpolating signal values at individual lattice points inside the above triangle when four types of inks (C, M, Y, and K) are used will be described below. Signal values at individual lattice points inside the triangle must be so interpolated as not to form any abrupt inflection point or discontinuation. If such an inflection point or discontinuation is contained, a pseudo contour is generated when an image is printed, or discontinuation or inversion of gradation occurs. Therefore, signal values inside the triangle are interpolated by using output signal values on the sides formed as described above.

As shown in FIG. 9, signal values of complementary color components can be smoothly expressed by performing linear interpolation in a direction D along a side AB connecting white and a primary color. For example, referring to FIG. 9, letting GRAYc(X0, Y) and GRAYk(X0, Y) be signal values of complementary color ink and black ink, respectively, in a position (X0, Y) on a side AC (gray line) connecting white and black, and COLORc(X1, Y) and COLORk(X1, Y) be signal values of complementary color ink and black ink, respectively, in a position (X1, Y) on a side BC connecting the primary color and black, complementary color ink Tc(X, Y) and black ink Tk(X, Y) in a position (X, Y) are calculated by the following interpolation equations.

$$Tc(X,Y)=X\times\{COLORc(X1,Y)-GRAYc(X0,Y)\}/(X1-X0)+GRAYc(X0,Y)$$

$$Tk(X,Y)=X\times\{COLORk(X1,Y)-GRAYk(X0,Y)\}/(X1-X0)+GRAYk(X0,Y)$$

By performing this interpolation for all the six primary colors, complementary color components for each of six triangles (in this specification, these triangles will be referred to as "basic triangles") each having white, black, and a primary color as its apexes can be formed.

A method of interpolating signal values at individual lattice points inside the above triangle when six types of inks (C, M, Y, K, LC, and LM) are used will be described below. To obtain signal values inside the triangle, ink types are classified into the following two types:

(1) Inks of color components
(2) Inks of complementary color components

For example, in a white-cyan-black triangle, (1) means C and LC inks, and (2) means M, Y, K, and LM inks.

Signal values of (1) are calculated by linear interpolation in a direction E in FIG. 8. As shown in FIG. 10, horizontal and vertical directions are taken as X and Y axes, respectively. Letting GRAY(X0, Y) denote an ink signal value on a gray line and WC(X1, Y0) an ink signal value on a line from white to a primary color, an ink signal value T(X,Y) at a point (X,Y) inside the triangle is calculated by $$T(X,Y)=X\times\{WC(X1,Y0)-GRAY(X0,Y)\}/(X1-X0)+GRAY(X0,Y)$$

Signal values of (2) are calculated by linear interpolation in the direction E in FIG. 8. Letting, similarly, CK(X1,Y) denote an ink signal value on a line from color to black, the ink signal value T(X,Y) is calculated by $$T(X,Y)=X\times\{CK(X1,Y)-GRAY(X0,Y)\}/(X1-X0)+GRAY(X0,Y)$$

By performing the above interpolating operation in the triangle for all the six primary colors, ink signal values of the triangles having white, black, and the primary colors as apexes can be formed.

Furthermore, by combining the six basic triangles thus formed, a rectangular parallelepiped representing a color space having white, black, and the six primary colors as its apexes as shown in FIG. 11A can be formed.

Interpolation of signal values at lattice points positioned between the individual basic triangles will be explained below. As in the above case, linear interpolation is preferred in order not to form any abrupt inflection point or discontinuation. Consider, as an example, signal values on a triangular plane Y positioned between primary colors COLOR1 and COLOR2 shown in FIG. 11A and having apexes A, B, and C. FIG. 11B shows this triangular plane Y along with lattice points. Letting COLOR1c(i,j1) and COLOR1k(i,j1) be signal values of complementary color ink of COLOR1 and black ink, respectively, in a position (i,j1) in the triangular plane Y, and COLOR2c(i,j2) and COLOR2k(i,j2) be signal values of complementary color ink of COLOR2 and black ink, respectively, in a position (i,j2), complementary color ink Tc(i,j) and black ink Tk(i,j) in a position (i,j) can be calculated by interpolation as per $$Tc(i,j)=j\times\{COLOR2c(i,j2)-COLOR1c(i,j1)\}/(j2-j1)+COLOR1c(i,j1)$$

$$Tk(i,j)=j\times\{COLOR2k(i,j2)-COLOR1k(i,j1)\}/(j2-j1)+COLOR1k(i,j1)$$

By performing this interpolating operation between red and yellow, yellow and green, green and cyan, cyan and blue, blue and magenta, and magenta and red, signal values of complementary colors at lattice points positioned between the basic triangles can be determined.

As described above, to form a color transform LUT, the input/output correspondence is formed for each of a gray line from white to black, line from a primary color to black, and line from white to the primary color. This correspondence is so formed as to minimize the granularity and maximize the color reproduction region. A color transform LUT can be formed by calculating signal values at lattice points by linear interpolation on the basis of these correspondences.

When a color transform LUT is formed by the above-mentioned method, black ink signal values in a white-blue-black basic triangle are, for example, as shown in FIG. 12. When data is printed by looking up this color transform LUT, a smooth printing result is obtained. However, the granularity is conspicuous in a region A in FIG. 12. This is so because, although in a gray line no graininess is produced by introducing no black ink up to a predetermined level (FIG. 2), small black ink signal values are introduced at lattice points in the region A, and so black ink is used in a portion slightly deviated from the gray line. This phenomenon occurs not only when blue is used but also when lattice points on a gray line at which black ink is introduced differ from lattice points on a primary color-black line at which black ink is introduced.

This also applies to lattice points between the basic triangles. FIG. 13 shows examples of black ink signal values in a triangular plane positioned between a white-yellow-black basic triangle and a white-red-black basic triangle. The triangle shown in FIG. 13 has an apex E on the yellow-black axis, an apex F on the white-black axis, and an apex G on the red-black axis. If a lattice position where black ink is introduced on a side EF is different from a lattice position where black ink is introduced on a side FG, the granularity deteriorates in a region B. This is so because, as described above, small black ink signal values are introduced into lattice points in the region B as a result of linear interpolation.

Also, many recent inkjet printers use LC ink and LM ink (to be referred to as light cyan ink and light magenta ink), in addition to regular cyan ink and magenta ink (to be referred to as dark cyan ink and dark magenta ink for discrimination). When these inks having low dye concentration is used, the printed dots themselves become difficult to visually recognize. In addition, a larger number of dots must be sprayed than when regular inks are used in order to print data of the same density. This can increase high-frequency components of the spatial frequency. The result is the advantage that the granularity of an inkjet printer is greatly improved.

Even when such an inkjet printer is used, however, problems similar to those described above arise. FIG. 14 shows dark cyan ink signal values in a white-red-black basic triangle formed by the linear interpolation described earlier. As in the case of black ink, the granularity worsens by dots of dark cyan ink in a region C. This is because small dark cyan ink signal values are introduced into lattice points in the region C.

C ink can also be linearly interpolated in the direction D in FIG. 8, not in the direction E in FIG. 8, analogous to complementary color ink. When this is performed, the results as shown in FIG. 15 are obtained. In this case, a smooth LUT can be formed, but C ink is slightly introduced into a portion F in FIG. 15. As is apparent from a gray line and a white-cyan line near the portion F, this portion F is a region which can be expressed by LC ink without using C ink. When C ink is slightly introduced into this region, dots of C ink become conspicuous although low-density LC ink is used. This results in printing inferior in granularity.

As described above, in the formation of a color transform LUT, if triangles are formed and linear interpolation is performed on the basis of values on the sides of these triangles, the granularity deteriorates by complementary color ink and black ink.

This will be further explained by using a white-cyan-black triangle. FIG. 16A shows ink signal values of color component C obtained by interpolating the interior of the triangle on the basis of previously formed sides by the aforementioned prior art. FIG. 16B shows ink signal values of color component LC obtained by interpolating the interior of the triangle on the basis of previously formed sides by the aforementioned prior art.

The signal values of LC ink shown in FIG. 16B are smooth. However, the signal values of C ink shown in FIG. 16A have an inflection point as seen in the direction of an arrow A, and largely jump as seen in a portion B. If an image is printed by using this LUT, a pseudo contour is generated, or discontinuation or inversion of gradation takes place.

SUMMARY OF THE INVENTION

The present invention has been made in consideration of the above problems, and has its object to provide a method and apparatus for forming a color transform lookup table which helps output a smooth image having no pseudo contour and excellent in granularity.

It is another object of the present invention to form a lookup table capable of obtaining a good output image without generating any pseudo contour or discontinuation or inversion of tone.

To achieve the above objects, method of forming a color transform lookup table of the present invention comprises the following steps. That is, the step of forming a first table describing the correspondence between representative points in an input color space and output signal values when transition is from white to black; the step of forming a second table describing the correspondence between representative points in an input color space and output signal values when transition is from white to a first primary color; the step of forming a third table describing the correspondence between representative points in an input color space and output signal values when transition is from the first primary color to black; the first interpolation step of forming a triangular plane OPQ which has black, white, and the first primary color as apexes O, P, and Q, respectively, which represents a color space, and in which the first table corresponds to an axis PO, the second table corresponds to an axis PQ, and the third table corresponds to an axis OQ, and interpolating output signal values at lattice points when the triangular plane OPQ is divided into a lattice structure; and the first replacement step of dividing the triangular plane OPQ into regions by using, as a boundary, a line AB connecting a lattice point A, on the axis PO, which is before black output signal value >0 in the transition from P to O and a lattice point B, on the axis QO, which is before black output signal value >0 in the transition from Q to O, and replacing the interpolated black output signal value with 0 and the output signal value of a complementary color corresponding to the primary color with a predetermined signal value, at individual lattice points in a region in the direction of the axis PQ.

Further, according to the present invention, the foregoing objects are attained by providing an apparatus for forming a color transform lookup table which is looked up when input image data is to be converted into subtractive mixture image data, comprising:

means that forms a first table describing the correspondence between representative points in an input color space and output signal values when transition is from white to black; means that forms a second table describing the correspondence between representative points in an input color space and output signal values when transition is from white to a first primary color; means that forms a third table describing the correspondence between representative points in an input color space and output signal values when transition is from the first primary color to black; first interpolating means that forms a triangular plane OPQ which has black, white, and the first primary color as apexes O, P, and Q, respectively, which represents a color space, and in which the first table corresponds to an axis PO, the second table corresponds to an axis PQ, and the third table corresponds to an axis OQ, and interpolating output signal values at lattice points when the triangular plane OPQ is divided into a lattice structure; and first replacing means that divides the triangular plane OPQ into regions by using, as a boundary, a line AB connecting a lattice point A, on the axis PO, which is before black output signal value >0 in the transition from P to O and a lattice point B, on the axis QO, which is before black output signal value >0 in the transition from Q to O, and replacing the interpolated black output signal value with 0 and the output signal value of a complementary color corresponding to the primary color with a predetermined signal value, at individual lattice points in a region in the direction of the axis PQ.

The present invention further provides an image processing method of forming a lookup table for transforming image data into a printing material color, comprises the following steps. That is, forming data on sides of a triangle representing a color space having white, black, and a primary color as apexes thereof; and forming data inside the triangle on the basis of the formed data on the sides of the triangle, wherein when the data inside the triangle is to be formed, a formation method is controlled in accordance with the output signal value of black on a side from white to black.

The present invention further provides a program for realizing an image processing method of forming a lookup table for transforming image data into a printing material color, comprising:

a program code of the step of forming data on sides of a triangle representing a color space having white, black, and a primary color as apexes thereof; and a program code of the step of forming data inside the triangle on the basis of the formed data on the sides of the triangle, the step comprising, when the data inside the triangle is to be formed, controlling a formation method in accordance with the output signal value of black on a side from white to black.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view showing an example of a color transform LUT;

FIGS. 12 to 16B are views showing interpolated signal values at lattice points in a triangular plane;

FIG. 21 is a flow chart showing a color transform LUT formation process according to the first embodiment of the present invention;

FIG. 31 is a graph showing ink signal values from cyan to black according to the third embodiment of the present invention;

FIG. 34 is a view showing the C ink signal values determined in the triangle of white, cyan, and black according to the third embodiment of the present invention.

DETAILED DESCRIPTION OF THE PREFERRED EMBODIMENTS

Preferred embodiments of the present invention will now be described in detail in accordance with the accompanying drawings.

(First Embodiment)

Figure 17:
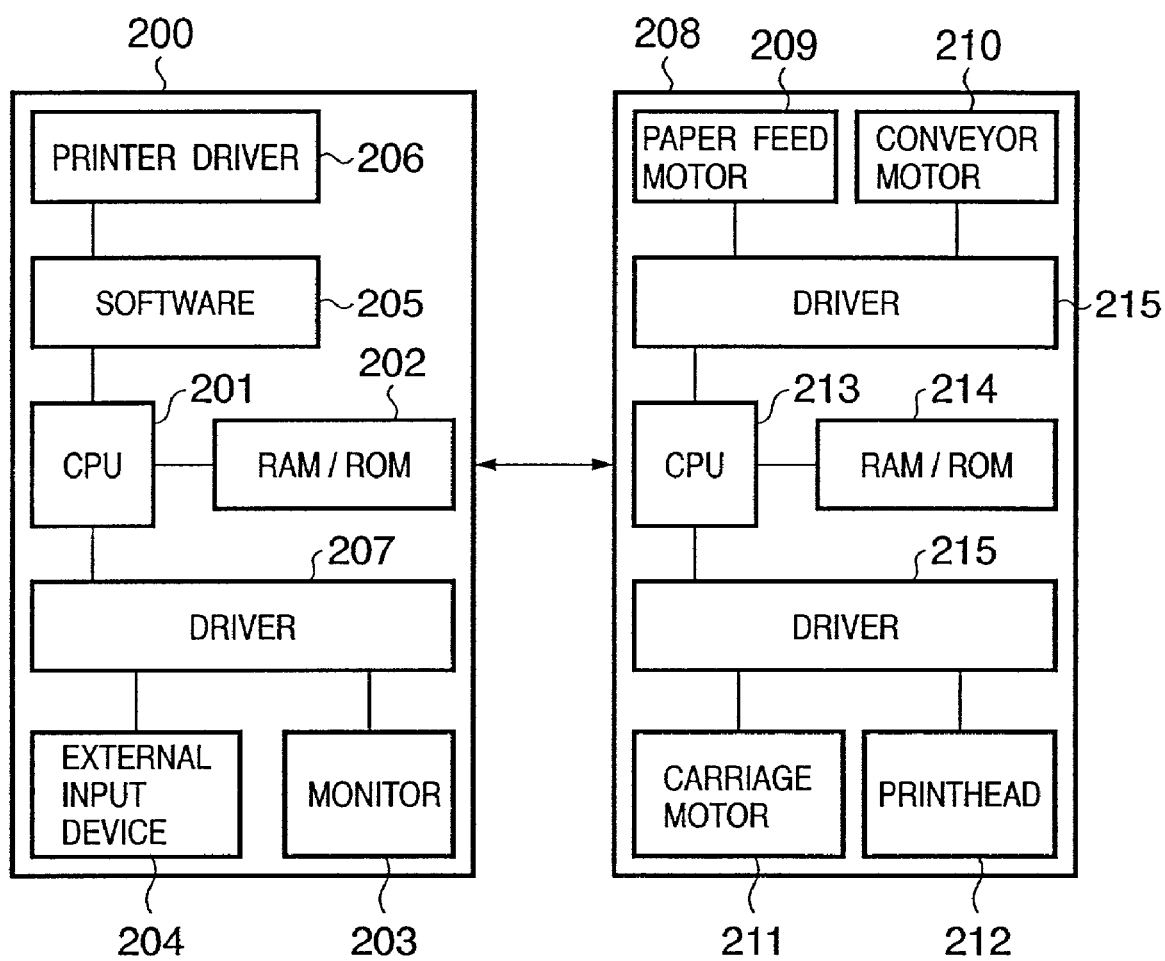
FIG. 17 is a block diagram schematically showing an image processing system according to an embodiment of the present invention.

FIG. 17 is a view showing functional blocks of an image processing system to which the present invention is applicable. As shown in FIG. 17, this system includes a printer 208 as a printing apparatus which prints out input data on a predetermined printing medium, and a host computer 200 which forms print data for image formation and outputs this print data to the printer 208.

The host computer 200 is a so-called personal computer. As shown in FIG. 17, this host computer 200 includes a CPU 201 for controlling the whole computer and a RAM/ROM 202 for storing data and various programs. In addition, a monitor 203 for displaying information to a user and an external input device 204 such as a keyboard and mouse are connected. Also, an application 205 for using the printer 208, a printer driver 206 for controlling driving of the printer 208, and a driver 207 for controlling the operations of other external devices are installed in a predetermined storage medium (not shown) such as a hard disk.

The printer 208 is an inkjet printer. As shown in FIG. 17, this printer 208 includes a CPU 213 for controlling the whole printer and a RAM/ROM 214 for storing data and control programs. The printer 208 also includes a paper feed motor 209 for supplying printing sheets, a conveyor motor 210 for conveying supplied printing sheets, a printhead 212 mounted on a carriage (not shown), and a carriage motor 211 for scanning the printhead 212. Drivers 215 control these paper feed motor 209, conveyor motor 210, carriage motor 211, and printhead 212.

In the above configuration, a user gives instructions by operating the external input device 204 while monitoring the monitor 203. For example, if the user issues a print request by using the application 205, the printer driver 206 is activated to execute a printing process. After a series of processes are performed by the printer driver 206, the data is compressed and transferred to the printer 208.

Upon receiving the data, the printer 208 expands the data and drives the paper feed motor 209, the conveyor motor 210, and the carriage motor 211 in accordance with the control programs stored in the RAM/ROM 214. Although not shown, the printhead 212 has a plurality of discharge nozzles and discharges ink where necessary. The small discharged ink droplets are printed on a printing sheet fed by the paper feed motor 209 and conveyed by the conveyor motor 210.

Processing by the printer driver 206 according to this embodiment will be described below.

Figure 18:
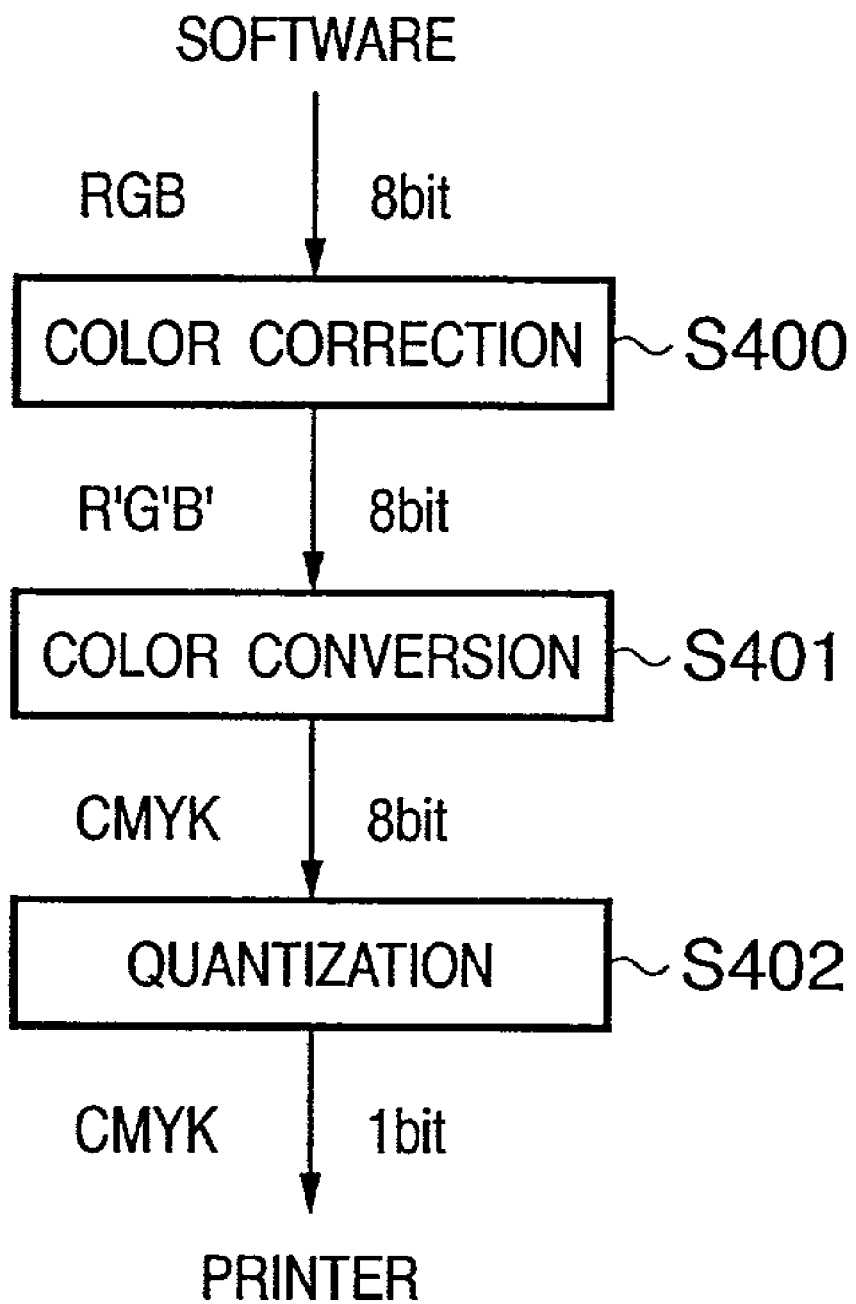
FIG. 18 is a flow chart showing the procedure of a printer driver according to the embodiment of the present invention.

FIG. 18 is a flow chart showing the procedure of control performed by the printer driver 206. First, in step S400, color correction is performed for data (generally, 8-bit data of each of R, G, and B) received from the application. This correction is so performed that colors approach to those displayed on the monitor 203 or photographic images and the like are printed more favorably. The method of correction need not be one method. For example, when an image to be printed is a photographic image, a color correction LUT which favorably outputs photographs is used; when an image to be printed is a graph or illustration, a color correction LUT which optimally prints out such images is used. That is, a plurality of color correction LUTs can be selectively used.

A color correction LUT used describes R'G'B' signal values corresponding to 4,913 points obtained by dividing each of RGB signal values into 16 levels, and R'G'B' values corresponding to input RGB values are referred to. If RGB values are present between the 16 levels, the values of R, G, and B are obtained by interpolation.

Figure 19A:
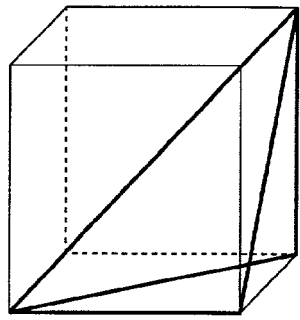
FIGS. 19A to 19G are views for explaining an LUT interpolation method according to the embodiment of the present invention.
Figure 19B:
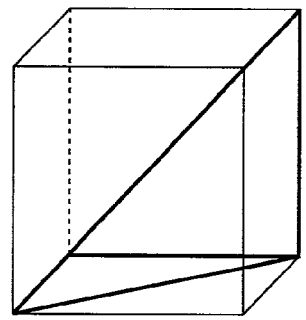
Figure 19C:
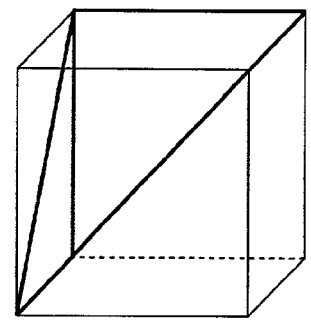
Figure 19D:
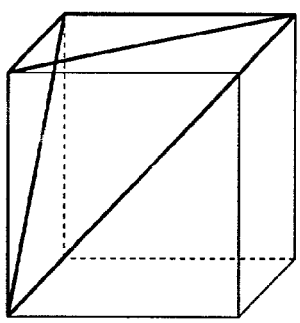
Figure 19E:
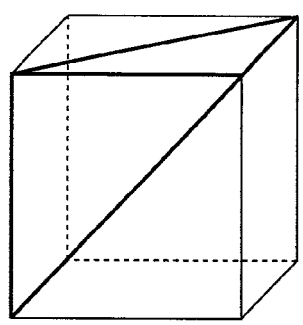
Figure 19F:
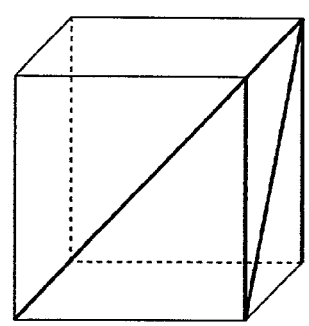
Figure 19G:
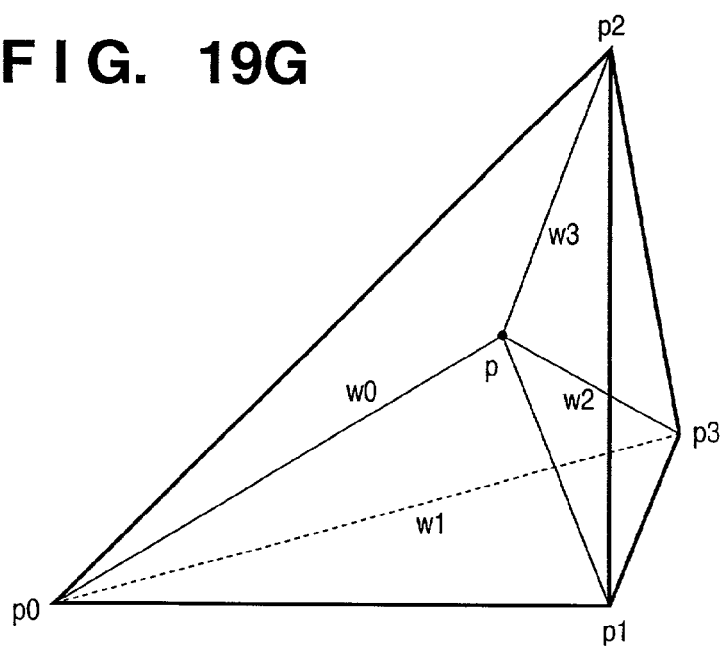

A tetrahedron interpolation method, for example, is used as the method of this interpolation. Tetrahedron interpolation is linear interpolation which uses four lattice points by dividing a three-dimensional space into unit tetrahedrons. The procedure is as follows. First, a three-dimensional space is divided into tetrahedrons as shown in FIGS. 19A to 19F. A tetrahedron to which a target point p belongs is determined. Letting $p_0$, $p_1$, $p_2$, and $p_3$ denote the four apexes of this tetrahedron, as shown in FIG. 19G, the tetrahedron is further divided into small tetrahedrons. Letting $f(p_0)$, $f(p_1)$, $f(p_2)$, and $f(p_3)$ denote the transformed values of extended points, an interpolated value f(p) is calculated by $$f(p) = \sum_{i=0}^{3} w_i f(p_i) = [w_0, w_1, w_2, w_3] \begin{bmatrix} f(p_0) \\ f(p_1) \\ f(p_2) \\ f(p_3) \end{bmatrix}$$

where each of $w_0$, $w_1$, $w_2$, and $w_3$ is the volume ratio of the apex $p_i$ to a small tetrahedron in the opposite position.

Referring back to the flow chart in FIG. 18, in step S401 the R'G'B' values determined in step S400 are transformed into ink colors cyan (C), magenta (M), yellow (Y), and black (K) by looking up the color transform LUT (details will be described later). That is, similar to the color correction in step S400, the R'G'B' values are transformed using a color transform LUT corresponding to 4,913 points obtained by dividing each of RGB signal values into 16 levels. The tetrahedron interpolation method described above is also used as the interpolation method.

The data transformed into ink colors by the color transform in step S401 is quantized in step S402. That is, the 8-bit data of each color is transformed into the number of bits printable by the printer 208. Since an inkjet printer has two values, i.e., printing (1)/non-printing (0), the data is quantized into one bit. This quantization is done by, e.g., error diffusion.

Figure 20:
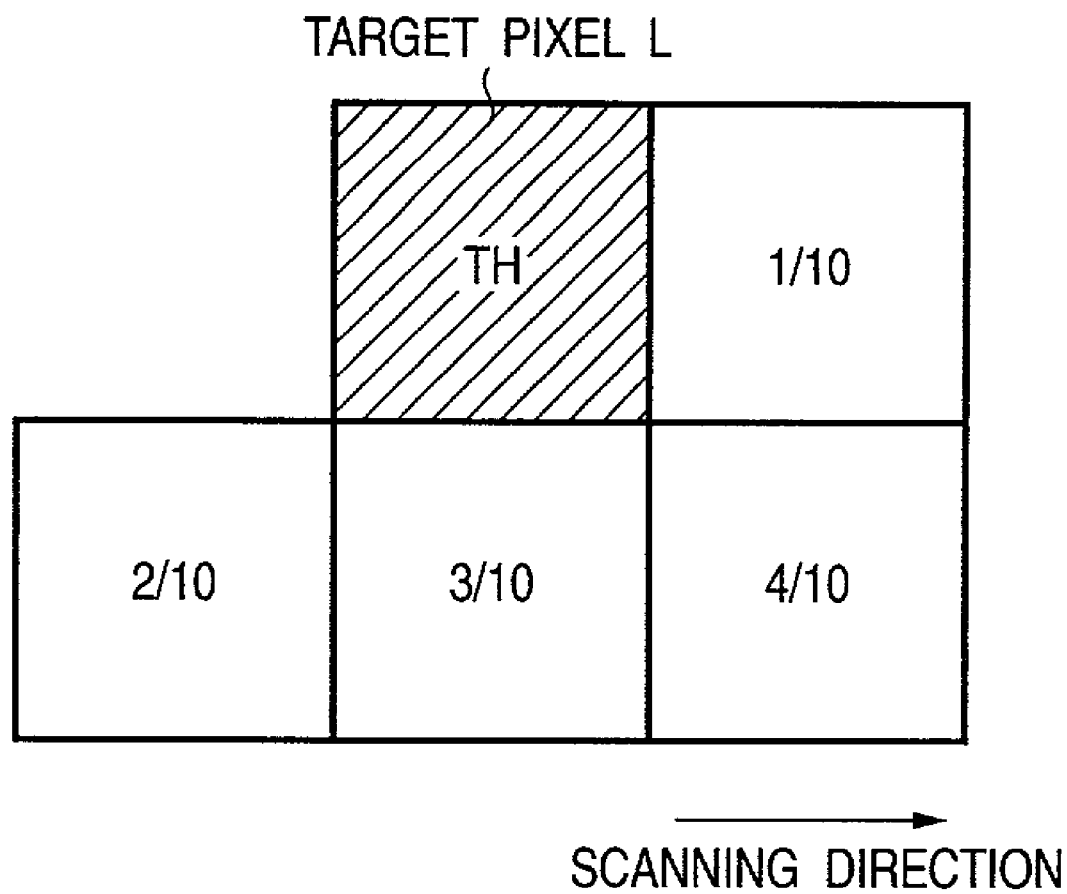
FIG. 20 is a view for explaining an error diffusion distribution method according to the embodiment of the present invention.

FIG. 20 shows an error distribution method in this error diffusion. A signal value L ($0 \leq L \leq 255$) of a target pixel is compared with a threshold value TH. The results are determined as L>TH . . . 1 (printing)

L≦TH . . . 0 (non-printing)

A produced error E (=L−TH) is distributed to surrounding pixels in FIG. 20 in accordance with distribution coefficients shown in the surrounding pixels. 1-bit image data is quantized by performing this process for all pixels and all ink colors. The 1-bit data thus processed is then compressed to shorten the transfer time, and transferred to the printer 208.

A method of forming the color transform LUT used in the color transform in step S401 described above will be explained in detail below.

FIG. 21 is a flow chart showing the color transform LUT formation process.

Figure 2:
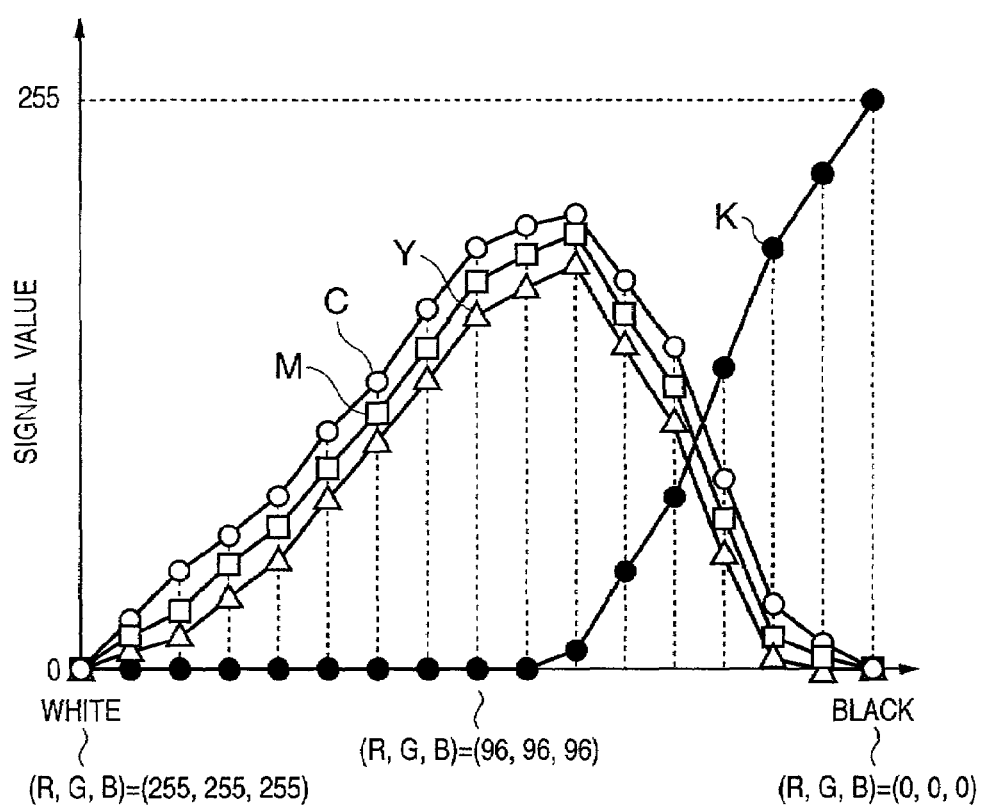
FIG. 2 is a graph for explaining an example of the correspondence between R, G, and B and C, M, Y, and K in a color transform LUT.
Figure 3:
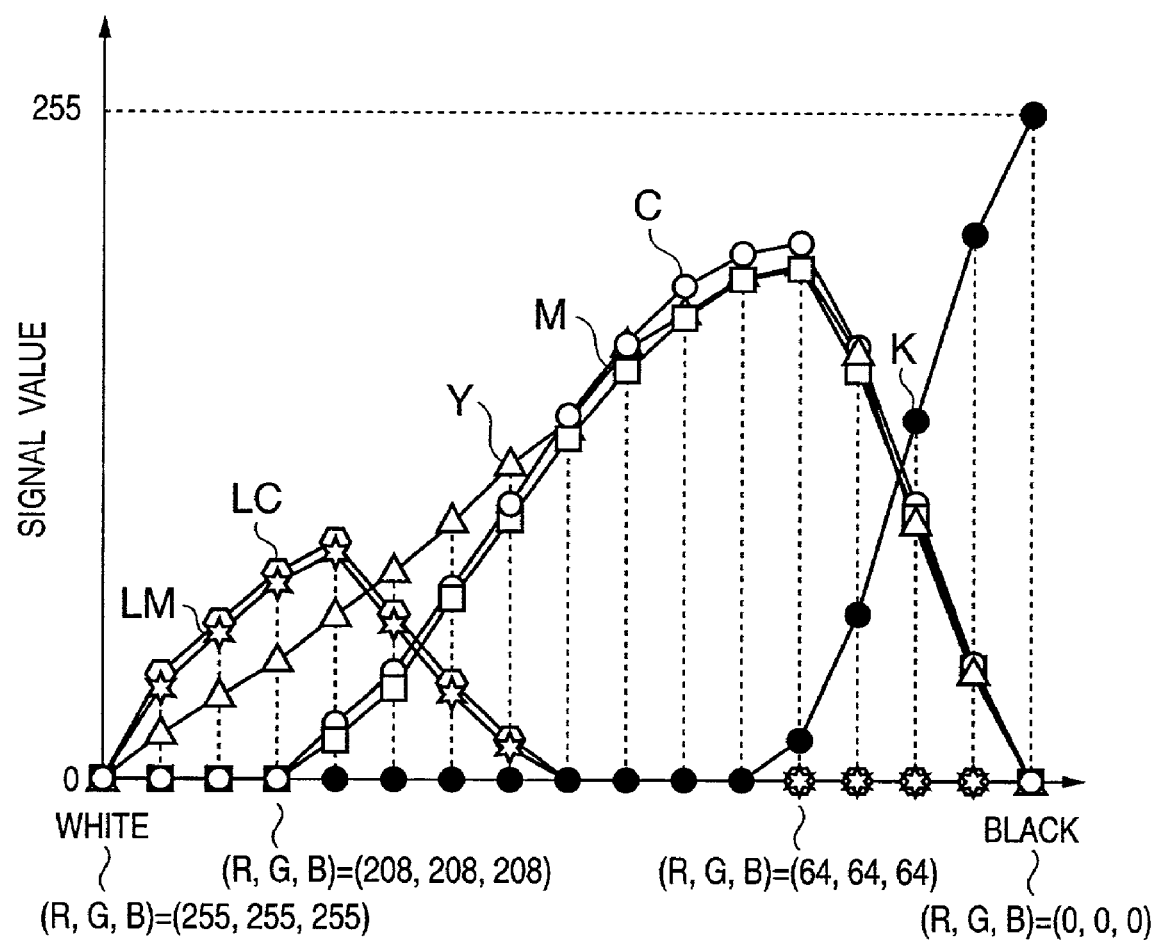
FIG. 3 is a graph for explaining an example of the correspondence between R, G, and B and C, M, Y, K, LC, and LM in a color transform LUT.
Figure 4:
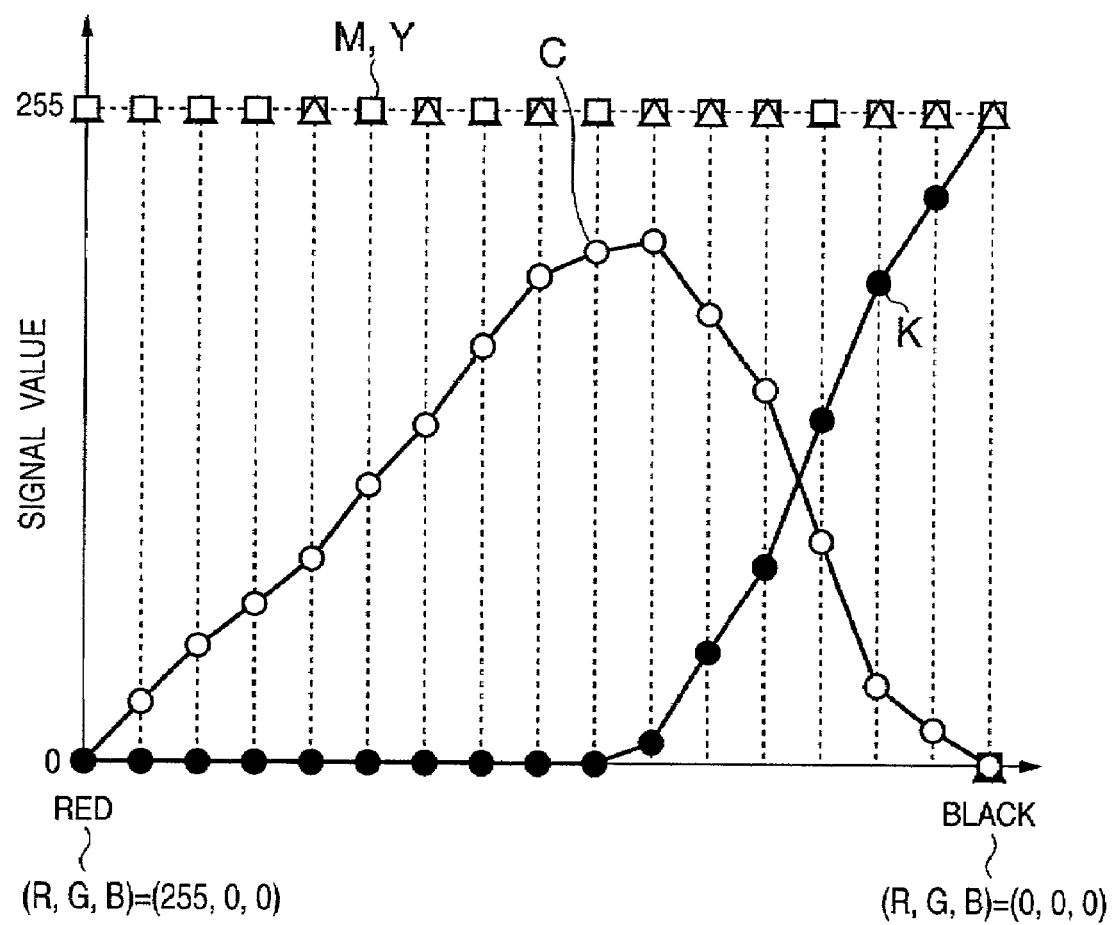
FIG. 4 is a graph for explaining an example of the correspondence between R, G, and B and C, M, Y, and K in a color transform LUT.
Figure 5:
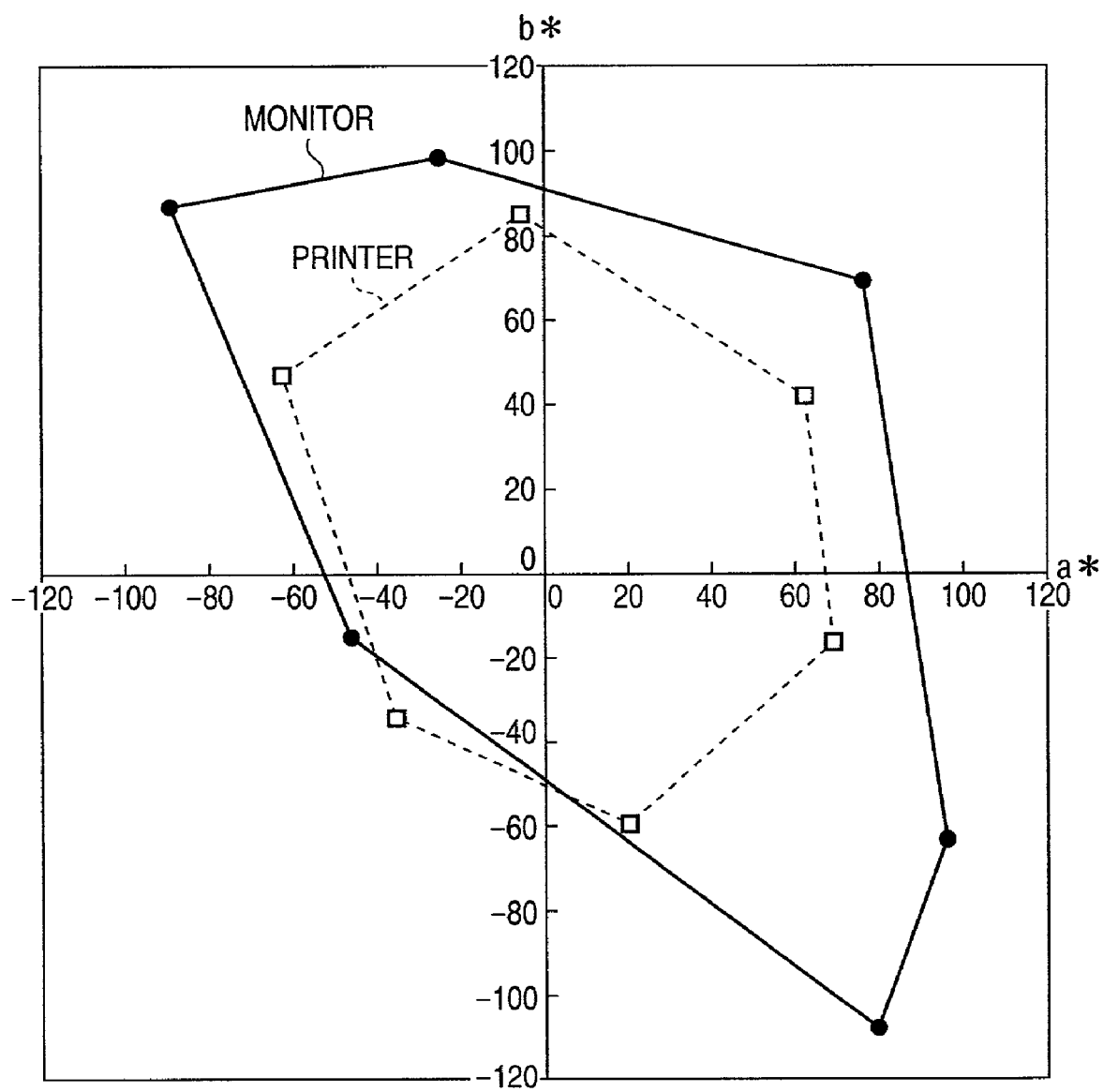
FIG. 5 is a graph showing the color reproduction ranges of a monitor and a printer.
Figure 6:
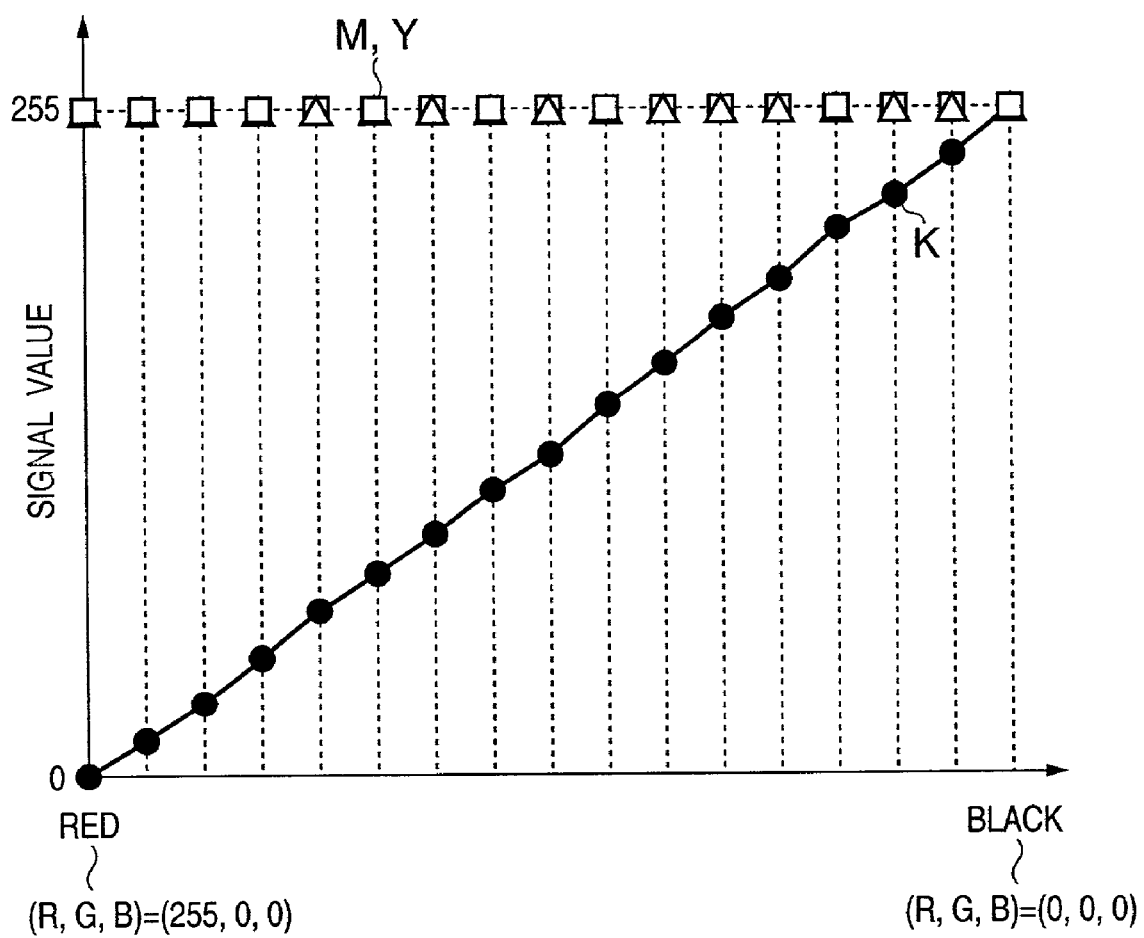
FIG. 6 is a graph for explaining an example of the correspondence between R, G, and B and C, M, Y, and K in a color transform LUT.
Figure 7:
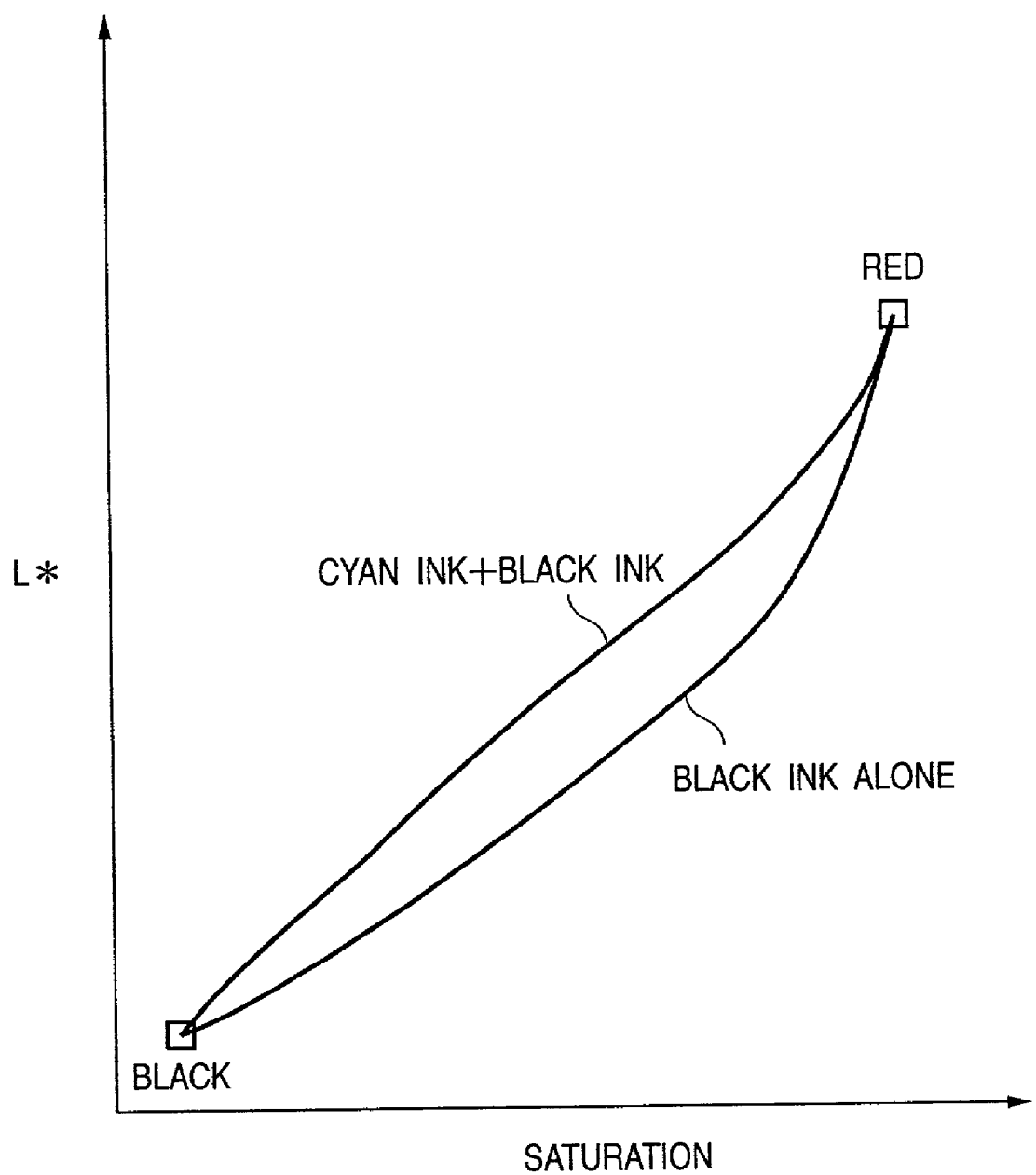
FIG. 7 is a graph for explaining color reproduction ranges resulting from a difference between the inks used.

In the first step, a white-black table is formed. For example, a table having the relationship shown in FIG. 2 is formed. Gray is formed from a white portion by using inks of cyan (C), magenta (M), and yellow (Y), and black ink is introduced such that the total ink amount printed does not exceed a predetermined allowed value of a printing sheet. Also, the tone of gray is adjusted by changing the ink amounts of cyan (C), magenta (M), and yellow (Y). This table is so formed that the reflection density of gradation from white to black linearly increases when the gradation is printed.

In the second step, a table from white to primary colors is formed. Primary colors cyan (C), magenta (M), and yellow (Y) are so formed that the reflection density linearly increases, similar to the gray line. Red (R), green (G), and blue (B) are formed by adding the thus formed primary colors. For example, red (R) is formed by adding magenta (M) and yellow (Y) each having linear reflection density.

In the subsequent third step, a table from primary colors to black is formed. First, complementary color inks are added such that the reflection density is linear, analogous to the gray line. If the total ink amount is within the allowable range, the table is settled. If the total ink amount exceeds the allowable range, some of the complementary color inks are replaced with black ink. Alternatively, the color reproduction region is decreased by reducing color components of secondary colors. Which method is to be selected is preferably determined in accordance with the dot diameter and density of ink on a printing sheet and the purpose of the printer.

Figure 22A:
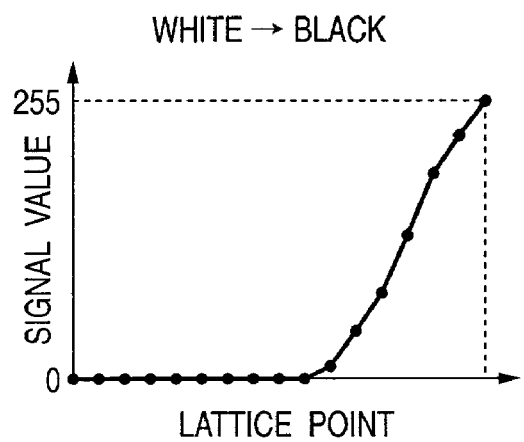
FIGS. 22A to 22D are graphs showing the loci of black ink signal values on lines from primary colors to black, in the table formed in the first embodiment of the present invention.
Figure 22B:
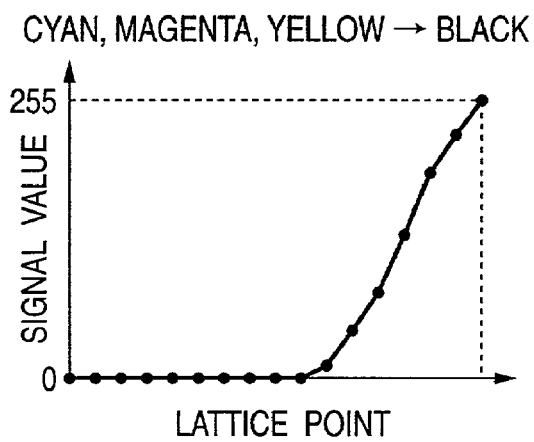

FIGS. 22A to 22D show the loci of black ink signal values obtained by the table from primary colors to black formed in this third step. FIG. 22A shows the locus of black ink signal values from white to black. FIG. 22B shows the locus of black ink signal values from cyan, magenta, and yellow to black. That is, FIGS. 22A and 22B illustrate the loci of black ink signal values in the direction from primary colors to black. FIGS. 22A and 22B indicate that black ink begins to be used from the same lattice point.

Figure 22C:
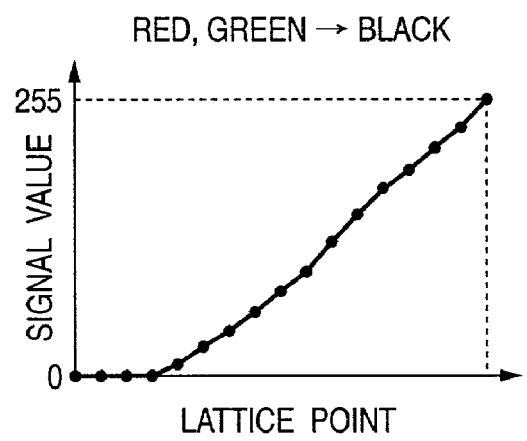
Figure 22D:
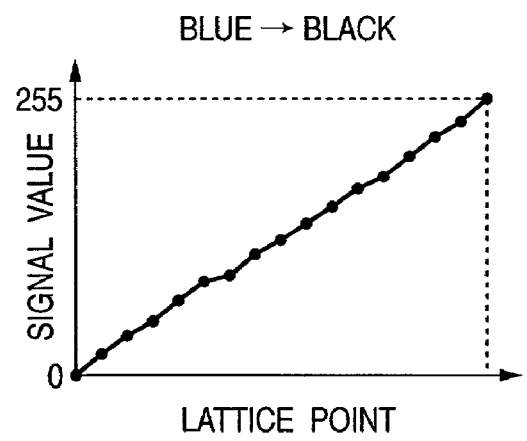

FIGS. 22C and 22D show the loci of black ink from secondary colors to black. That is, FIG. 22C shows a line from red and green to black. Compared to FIGS. 22A and 22B, black ink begins to be used from an earlier lattice point. On a line from blue to black shown in FIG. 22D, black ink is used from the beginning without using any complementary color.

A color space reproduced by the tables formed in the above first to third steps is expressed by a white-primary color-black basic triangle.

In the fourth step, on the basis of each table formed, output signal values at individual lattice points inside a basic triangle are linearly interpolated. This linear interpolation when the primary color is red will be explained by using a white-red-black basic triangle.

Figure 23:
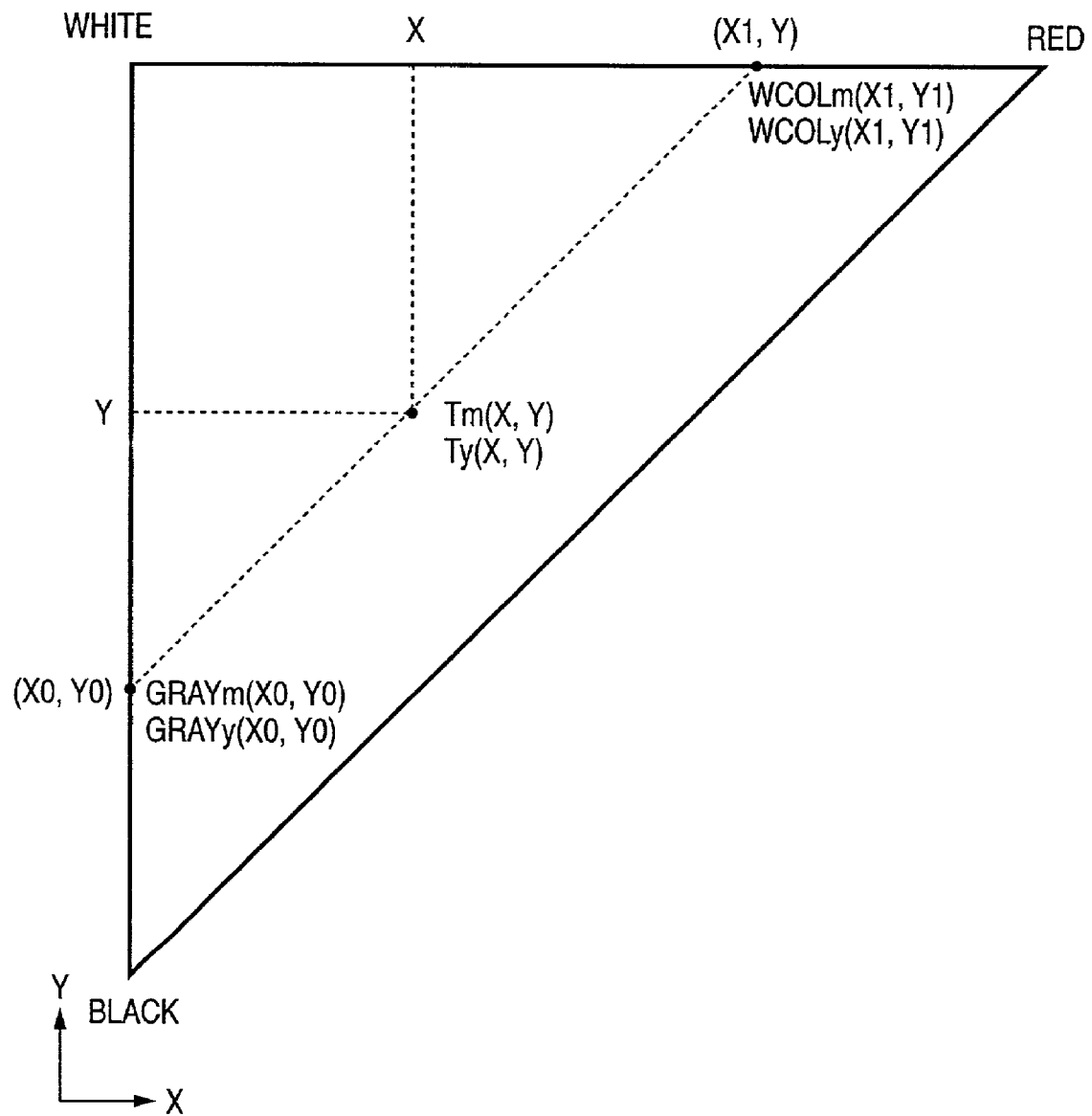
FIG. 23 is a view for explaining interpolation according to the first embodiment of the present invention.

Initially, signal values of magenta (M) and yellow (Y) as color components of red are determined. As shown in FIG. 23, letting Tm(X,Y) and Ty(X,Y) be signal values of magenta and yellow, respectively, at a lattice point (X,Y) in the basic triangle, lines are drawn parallel to a red-black side from this point. The intersections with a gray line (white-black side) and a white-red side are (X0,Y0) and (X1,Y1), respectively. Also, letting GRAYm(X0,Y0) and GRAYy(X0,Y0) be signal values of magenta ink and yellow ink, respectively, at a lattice point (X0,Y0), and WCOLm(X1, Y1) and WCOLy(X1,Y1) be signal values of magenta ink and yellow ink, respectively, at a lattice point (X1,Y1), Tm(X,Y) and Ty(X,Y) are calculated by interpolation Tm(X,Y)=X×{WCOLm(X1,Y1)−GRAYm(X0,Y0)}/
(X1−X0)+GRAYm(X0,Y0)

Ty(X,Y)=X×{WCOLy(X1,Y1)−GRAYy(X0,Y0)}/
(X1−X0)+GRAYy(X0,Y0)

Figure 24:
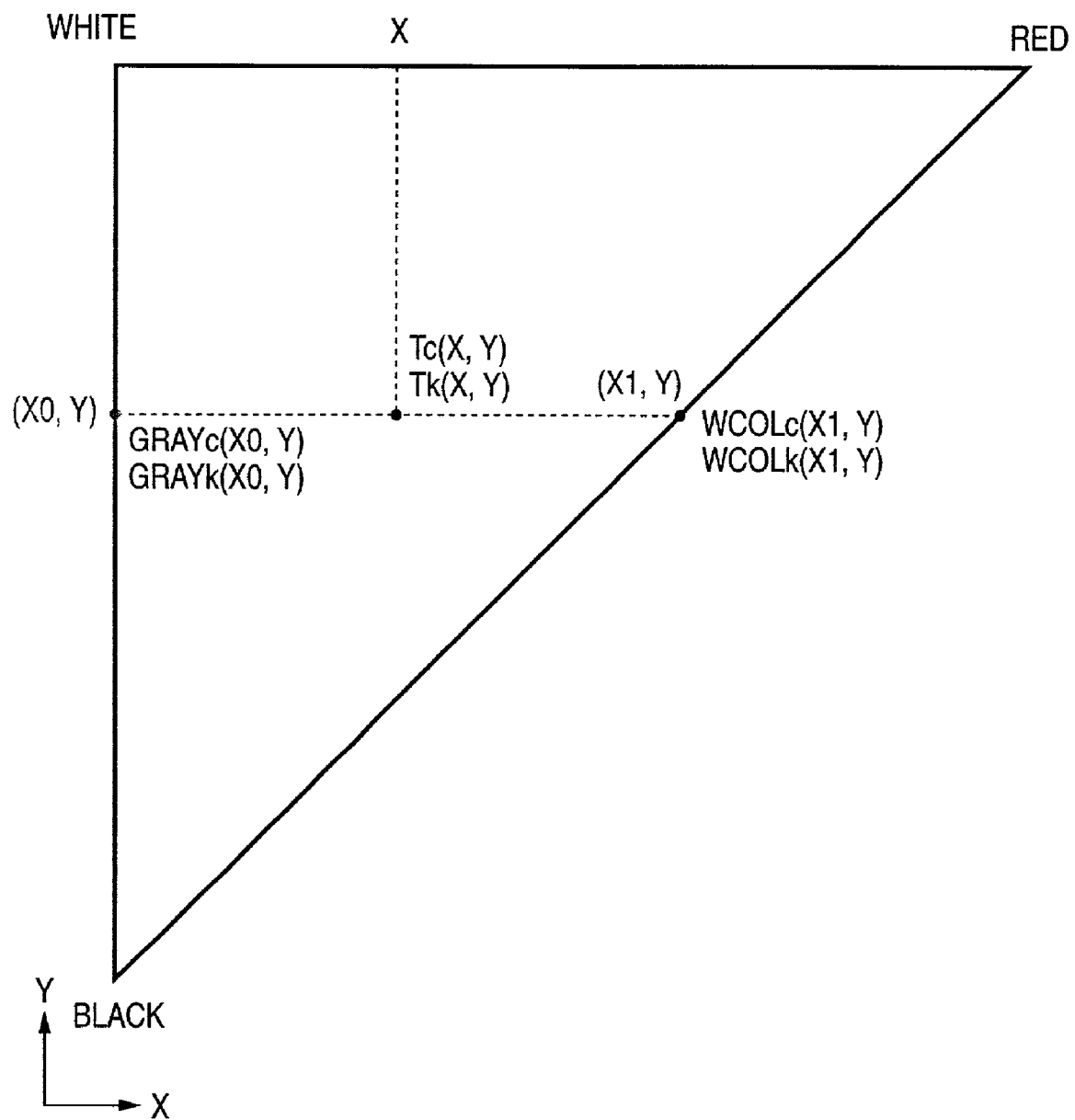
FIG. 24 is a view for explaining interpolation according to the first embodiment of the present invention.

Cyan ink as a complementary color and black ink will be explained with reference to FIG. 24. Referring to FIG. 24, letting Tc (X, Y) and Tk (X, Y) be signal values at a lattice point (X, Y) in the triangle, lines are drawn parallel to a white-red side from this point. The intersections with a gray line (white-black side) and a red-black side are (X0, Y) and (X1, Y), respectively. Also, letting GRAYc (X0, Y) and GRAYk (X0, Y) be signal values of cyan ink and black in, respectively, at a lattice point (X0, Y), and WCOLc (X1, Y) and WCOLk be signal values of cyan ink and black ink, respectively, at a lattice point (X1, Y), Tc (X. Y) and Tk (X, Y) are calculated by interpolation.

Tc (X, Y)=X×{WCOLc (X1, Y)−GRAYc (X0, Y)}/
(X1−X0)+GRAYc(X0, Y)

Tk (X, Y)=X×{WCOLk (X1, Y)−GRAYc (X0, Y)}/
(X1−X0)+GRAYk (X0, Y)

By this linear interpolation in the fourth step, output signal values at the individual lattice points inside the basic triangle are calculated.

In the fifth step shown in FIG. 21, black ink is replaced with complementary color ink.

Figure 25:
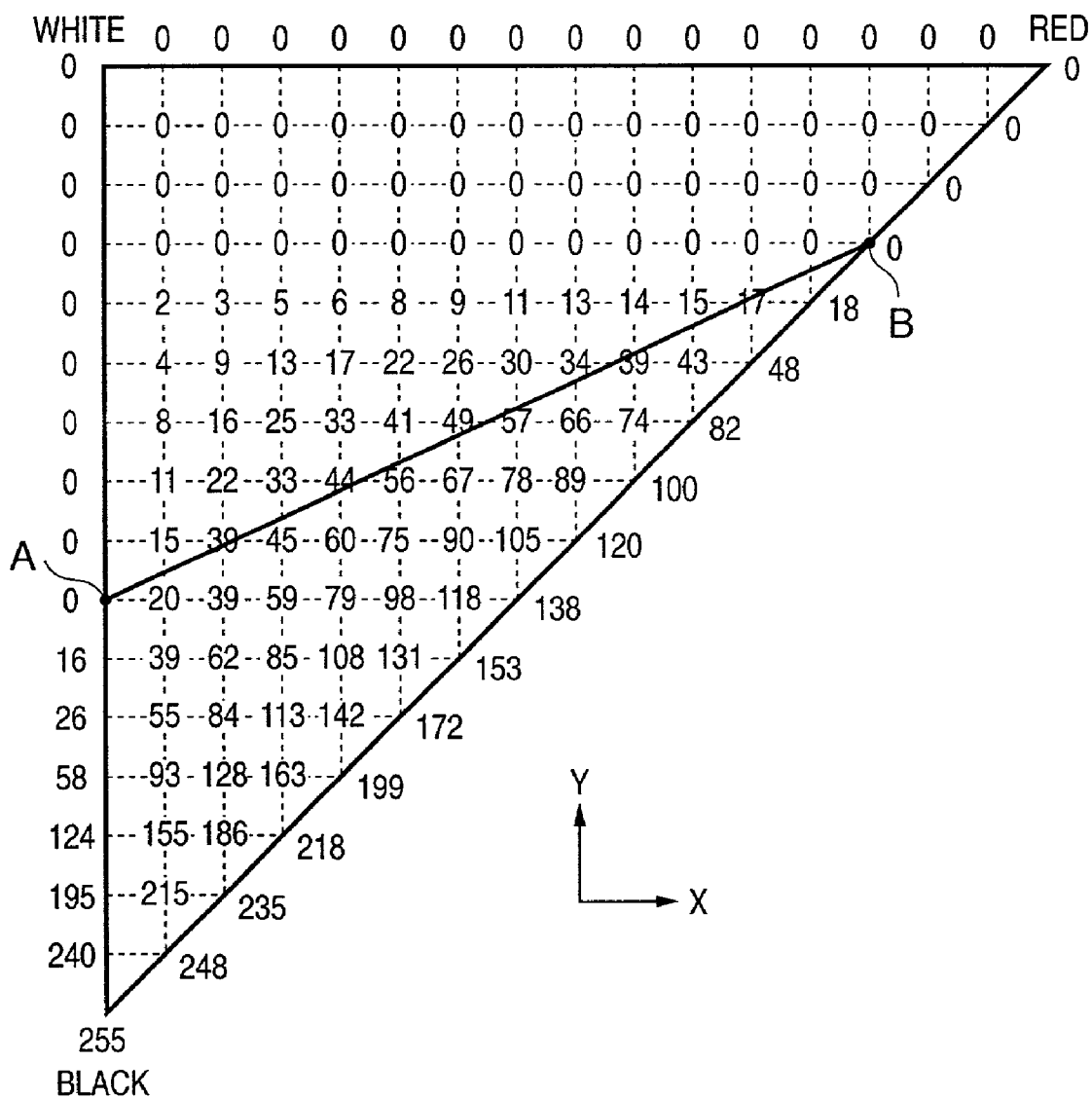
FIGS. 25 and 26 are views for explaining an interpolated value replacement process according to the first embodiment of the present invention.

FIG. 25 is a view showing black ink signal values at lattice points to be interpolated by the processing up to the above fourth step in the white-red-black basic triangle. Referring to FIG. 25, points A and B are lattice points at which black ink begins to be introduced on a white-black side (gray line) and a red-black side, respectively. In this case, black ink is replaced with cyan ink by using a straight line AB connecting these two points as a boundary line. For example, black ink at lattice points above this straight line AB is replaced with cyan ink. In this replacement, the amount of cyan ink is so determined that the lightness or density is equal to that when black ink is used. Since black ink introduced near the gray line can be eliminated by this processing, the granularity can be reduced. That is, it is possible to prevent deterioration of the granularity which occurs when lattice points on the gray line at which black ink is introduced are different from lattice points on the red-black line at which black ink is introduced.

Figure 26:
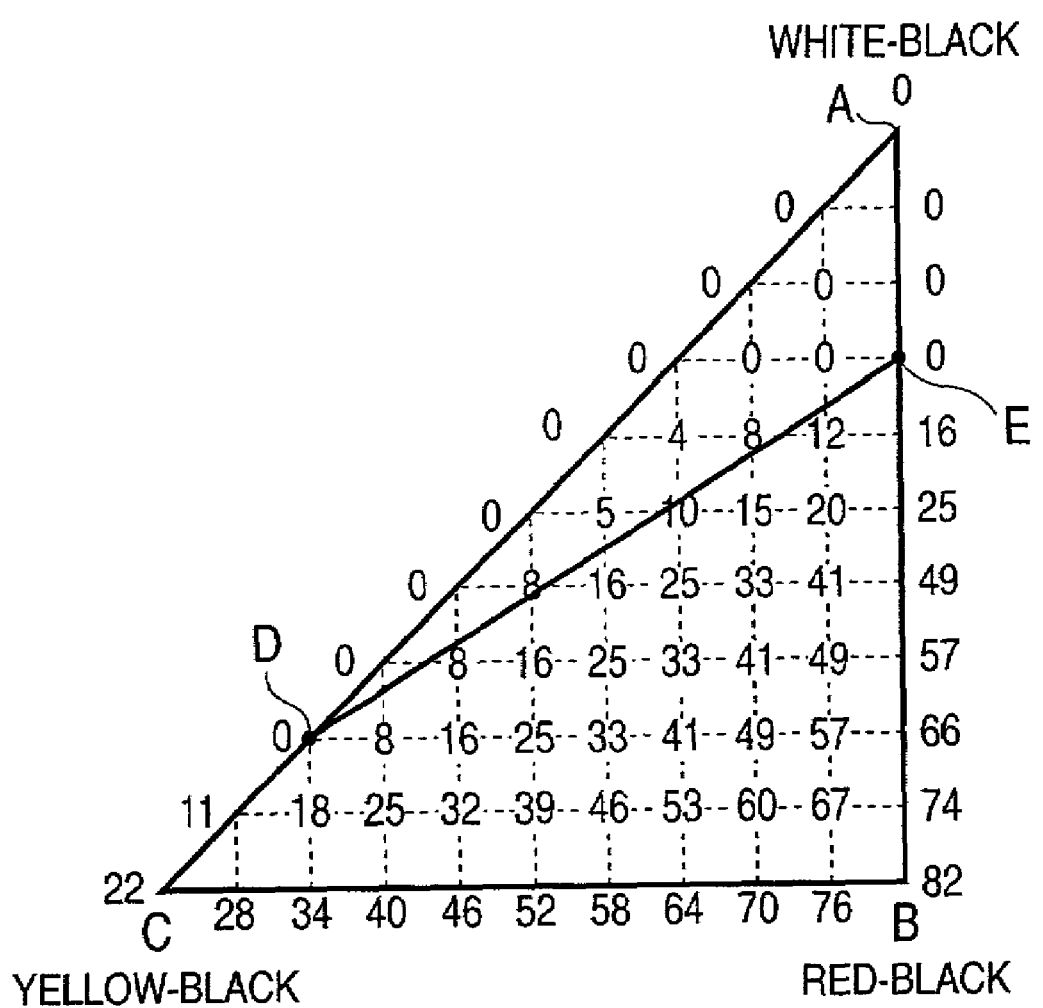

In the sixth step shown in FIG. 21, signal values at lattice points positioned between basic triangles are interpolated. As an example, interpolation of signal values at lattice points positioned between a white-red-black basic triangle and a white-yellow-black basic triangle will be described below. FIG. 26 shows a triangle having as its apexes a point A on a white-black axis, a point B on a red-black axis, and a point C on a yellow-black axis (each of the points A, B, and C is the Nth (N≦16) point from black). As in the fourth step, signal values of magenta ink and yellow ink as color components of red and signal values of complementary color ink and black ink are separately interpolated. That is, magenta ink and yellow ink are linearly interpolated in a direction along a side AC in FIG. 26, and complementary color ink and black ink are linearly interpolated in a direction along a side BC therein. The thus formed black ink signal values at individual lattice points are shows in FIG. 26.

In the seventh step shown in FIG. 21, black ink is replaced with complementary color ink, analogous to the fifth step. In this processing, a straight line DE connecting a lattice point D on the side AC at which black ink begins to be introduced and a lattice point E on a side AB at which black ink begins to be introduced in FIG. 26 is a boundary line. Black ink at lattice points above this boundary line DE is replaced with cyan ink. As in the fifth step, cyan ink signal values are so selected as to maintain the lightness or density. Since this eliminates black ink near the side AC, the granularity can be reduced.

As explained above, an image having reduced granularity and smooth gradation can be obtained by the color transform LUT formed by this embodiment.

(Second Embodiment)

In this embodiment, the present invention is applied to an inkjet printer which uses light cyan ink and light magenta ink in addition to cyan, magenta, yellow, and black inks, in order to reduce the granularity.

The system configuration is the same as FIG. 17 except that a printer driver 206 transforms R'G'B' values into the above six ink colors (cyan, magenta, yellow, black, light cyan, and light magenta) in color transform.

Figure 27:
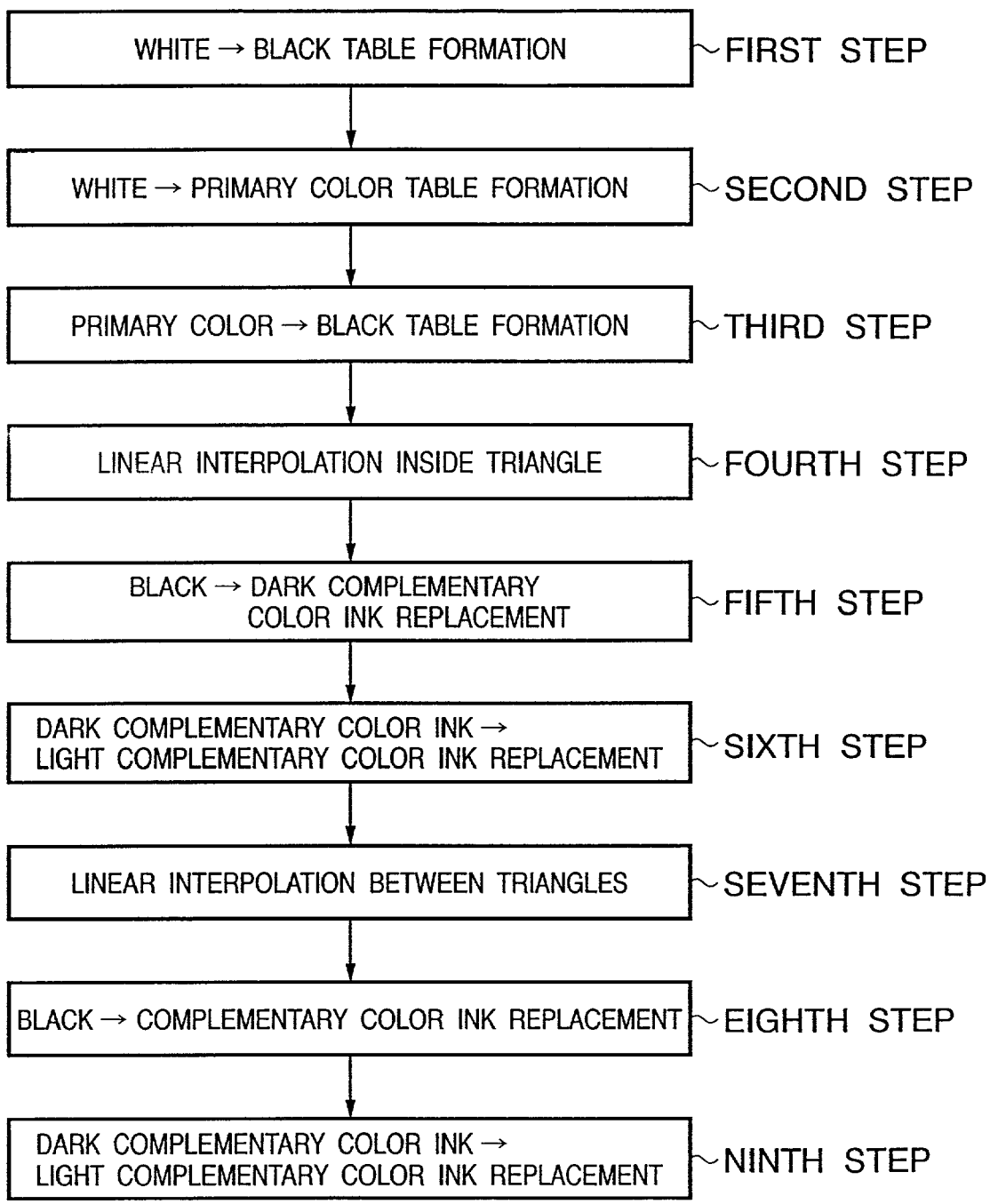
FIG. 27 is a flow chart showing a color transform LUT formation process according to the second embodiment of the present invention.

FIG. 27 is a flow chart showing a color transform LUT formation procedure according to this embodiment. The first to fifth steps are the same as in the first embodiment, so these processes are explained in the first embodiment. In the fifth step, however, black ink is replaced with dark complementary color ink by a process analogous to the fifth step in the first embodiment.

Figure 28:
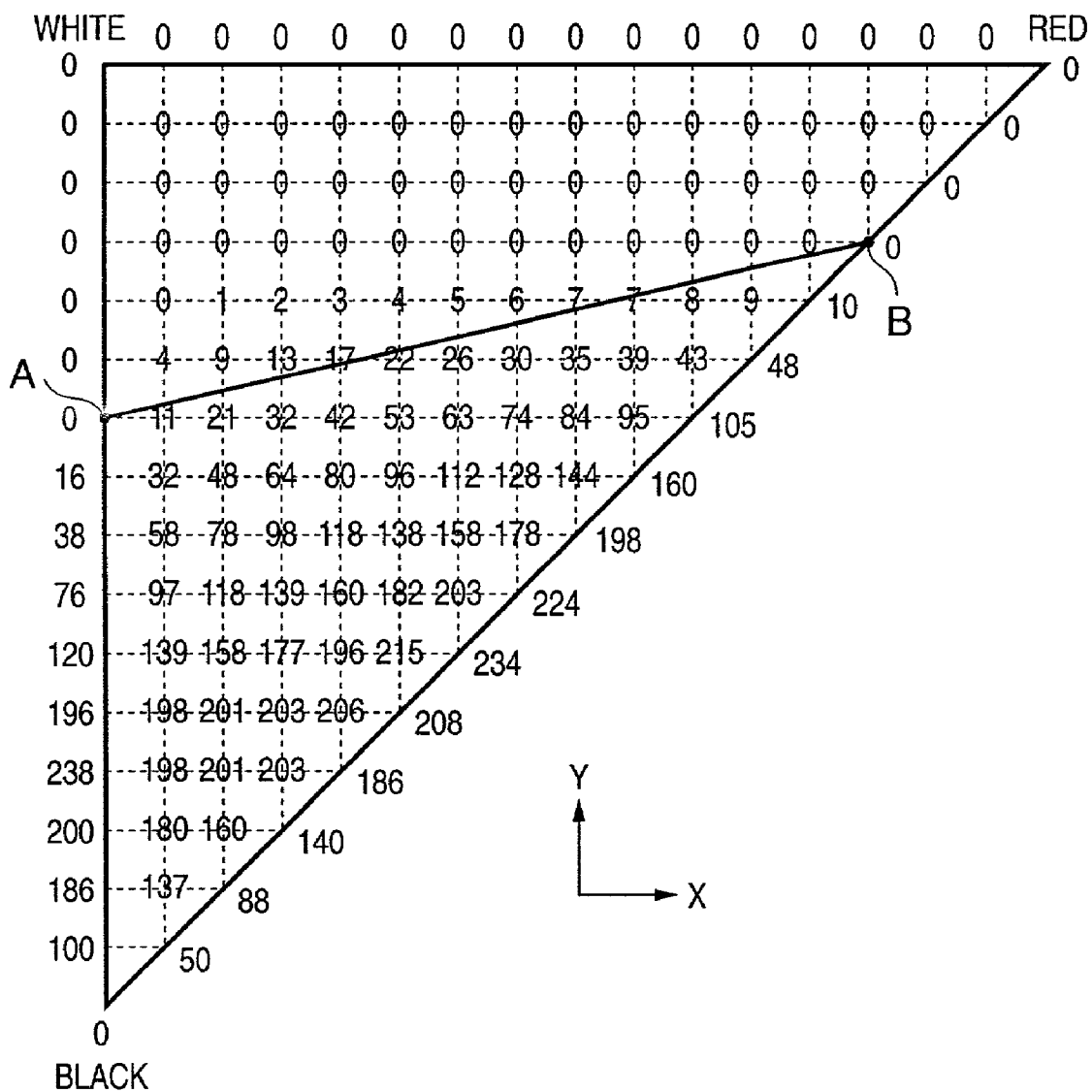
FIGS. 28 and 29 are views for explaining an interpolated value replacement process according to the second embodiment of the present invention.

FIG. 28 is a view showing dark cyan signal values at lattice points in a white-red-black basis triangle after black ink is replaced with dark complementary color ink in the fifth step. Referring to FIG. 28, points A and B are lattice points at which black ink begins to be introduced on a white-black side (gray line) and a red-black side respectively. A straight line AB connecting these points A and B is regarded as boundary line, and dark cyan ink at lattice points above this straight line AB is replaced with light cyan ink (the sixth step in FIG. 27). In this replacement, signal values of light cyan are so determined that the lightness or density is equal to that when dark cyan is used.

The seventh and eighth steps correspond to the sixth and seventh steps, respectively, in the first embodiment, so these processes are explained in the first embodiment.

FIG. 26 shows a triangle having, as its apexes, a point A on a white-black axis, a point B on a red-black axis, and a point C on a yellow-black axis (each of these points A, B, and C is the Nth (N≦16) point from black). Analogous to the fourth step, signal values of magenta ink and yellow ink as color components of red and signal values of complementary color ink and black ink are separately interpolated. That is, magenta ink and yellow ink are linearly interpolated in a direction along a side AC, and complementary color ink and black ink are linearly interpolated in a direction along a side BC. The thus formed black ink signal values at lattice points are shown in FIG. 26.

Figure 29:
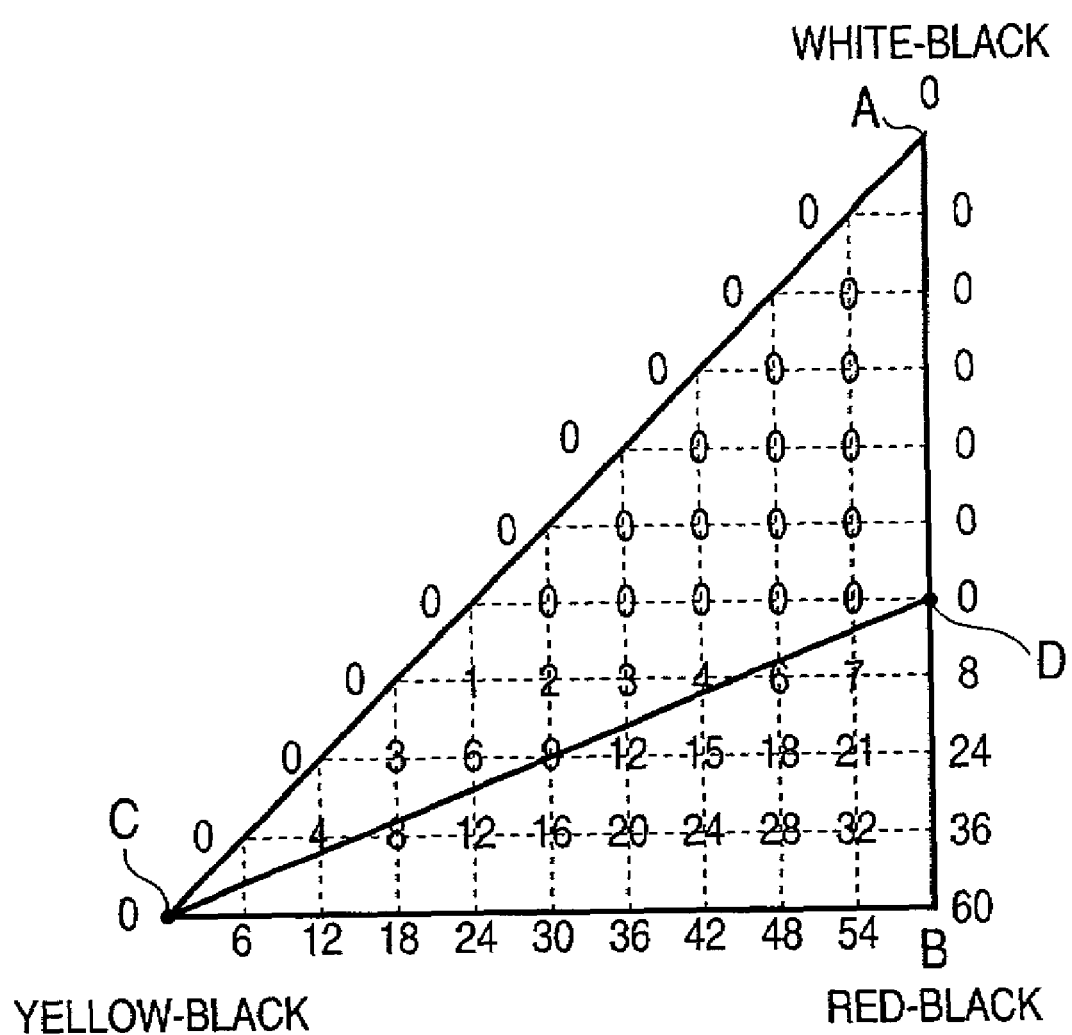

FIG. 26 shows dark cyan signal values at lattice points in the triangle having, as its apexes, the point A on the white-black axis, the point B on the red-black axis, and the point C on the yellow-black axis, after black ink is replaced with complementary color ink in the eight step. Referring to FIG. 29, a straight line CD connecting the point C and a point D is regarded as boundary, and dark cyan ink above this straight line CD is replaced with light cyan ink (the ninth step in FIG. 27). Similar to the above replacement, this replacement is done such that the lightness or density of equal to that when dark cyan is used.

In this embodiment as described above, even for an inkjet printer using light ink, it is possible to form a color transform LUT capable of obtaining an image in which granularity produced by dark ink dots is reduced, by performing transform of a complementary color from dark ink to light ink similar to transform from black ink to complementary color ink.

(Third Embodiment)

In this embodiment, the present invention is applied to an inkjet printer which uses light cyan ink and light magenta ink in addition to cyan, magenta, yellow, and black inks, in order to reduce the granularity.

The system configuration is the same as FIG. 17 except that a printer driver 206 transforms R'G'B' values into the six ink colors (C, M, Y, K, LC, and LM) described above in color transform.

Figure 30:
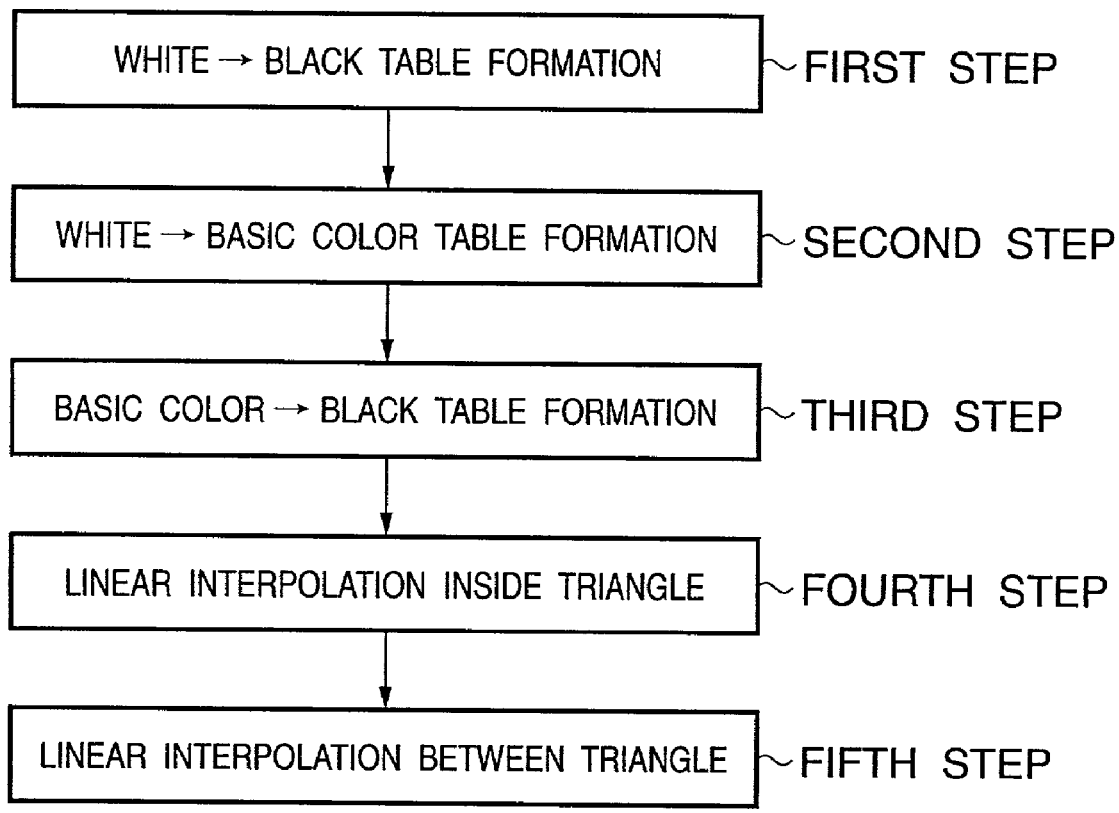
FIG. 30 is a flow chart showing a color transform LUT formation procedure according to the third embodiment of the present invention.

A method of forming a color transform LUT for transforming RGB data into ink colors will be described below. FIG. 30 shows a flow chart of the formation procedure. First, to complete the sides of a white-primary color-black triangle, a white-black table is formed in the first step. This is a table as shown in FIG. 2. Gray is formed from a white portion by using Y, LC, and LM inks, and LC and LM inks are replaced with C and M inks such that the total ink amount printed does not exceed the allowed value of a printing medium. Likewise, C, M, and Y inks are replaced with K ink, and only K ink is used in black. Also, the tone of gray is adjusted by changing the individual color ink amounts. At the same time, the table is so formed that the reflection density of gradation from white to black linearly increases when the gradation is printed.

The second step is the formation of a table from white to primary colors. Primary colors cyan, magenta, and yellow are so formed that the reflection density linearly increases as in the gray line. However, cyan and magenta are formed by initially using LC and LM inks and then using C and M inks, respectively. Red, green, and blue are formed by adding the primary colors thus formed. For example, red is formed by adding magenta and yellow each having linear reflection density.

In the third step, a table from primary colors to black is formed. First, complementary color inks are added such that the reflection density is linear similar to the gray line. If complementary color inks are C and M, LC and LM inks having low density are added. If the total ink amount is within the allowable range of a printing medium, the table is settled. If the total ink amount exceeds the allowable range, LC and LM inks or C, M, and Y inks are partially replaced with C and M inks or K ink, respectively, or color components of the secondary colors are reduced, such that the total ink amount falls within the allowable range. In the latter case, the color space is narrowed by the reduced ink amount. Which method is to be selected is determined in accordance with the dot diameter and density of ink on a printing medium and the purpose of the printer. For instance, signal values on a line from a primary color to black are shown in FIG. 31 by taking cyan as an example.

In the fourth step, signal values inside the white-primary color-black triangle formed are determined by linear interpolation by using the sides of this triangle. This step will be described by taking a white-cyan-black triangle having cyan as a primary color as an example.

Figure 8:
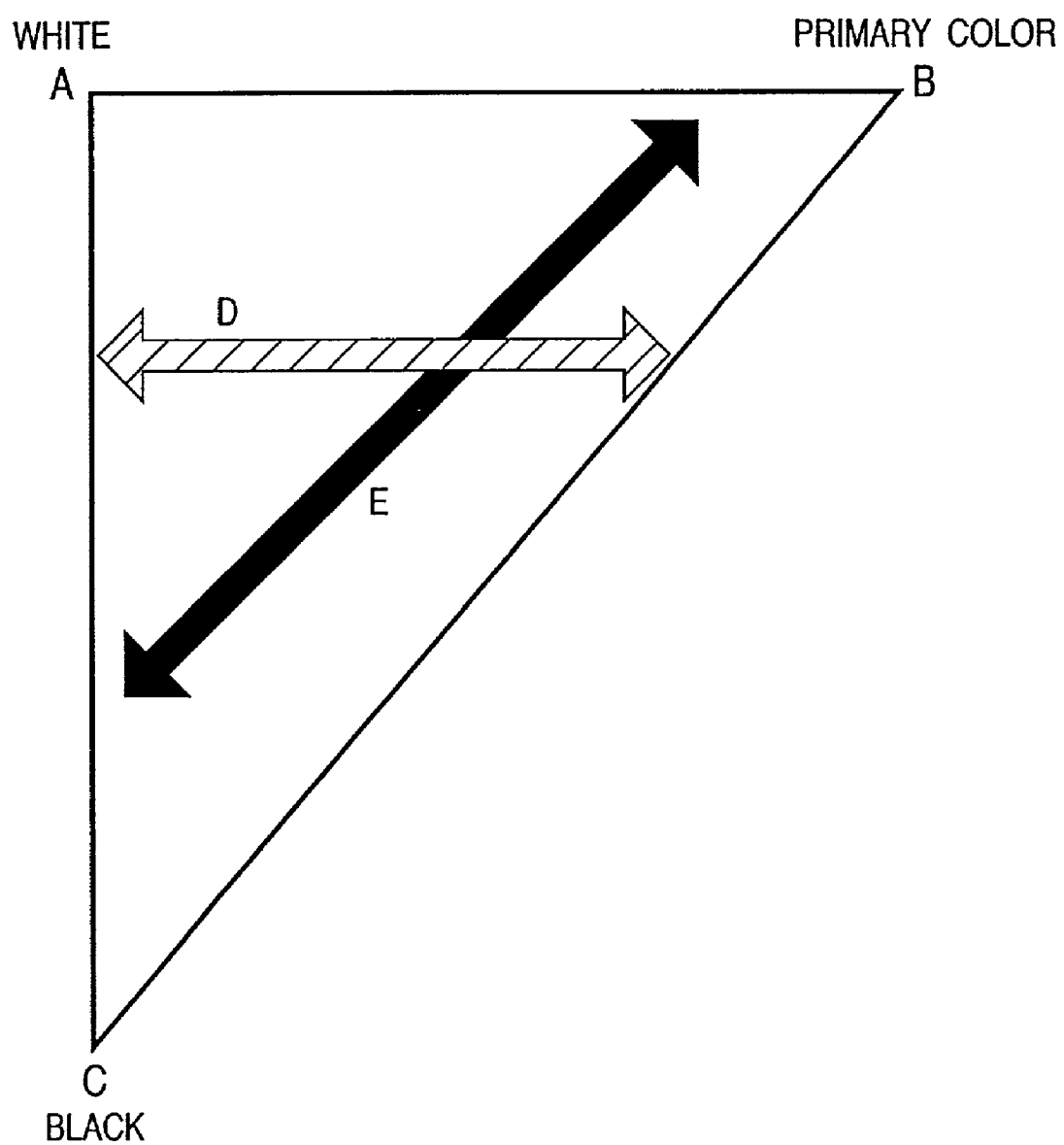
FIG. 8 is a view for explaining a color transform LUT formation process.
Figure 9:
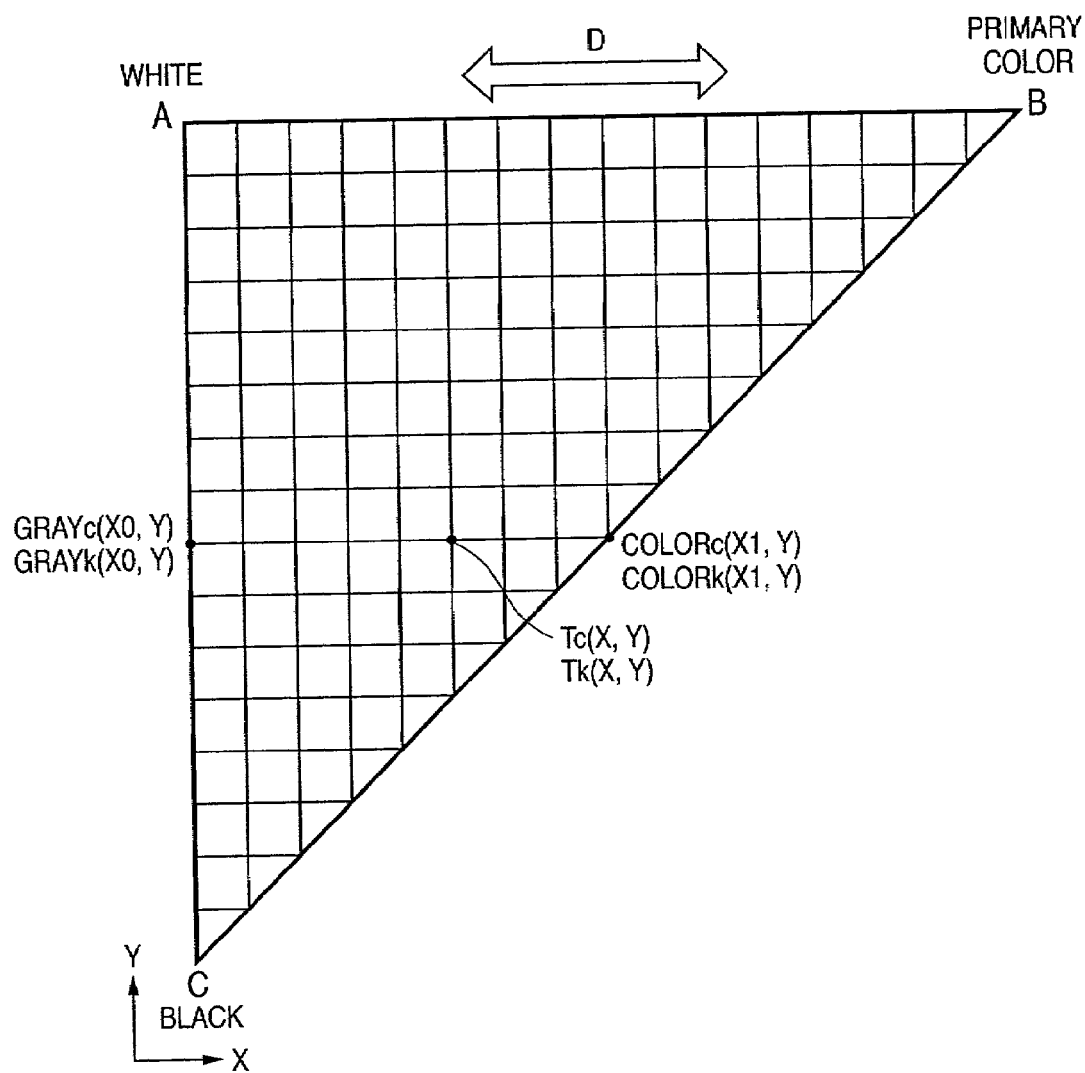
FIGS. 9 and 10 are views for explaining interpolation of signal values at lattice points.
Figure 10:
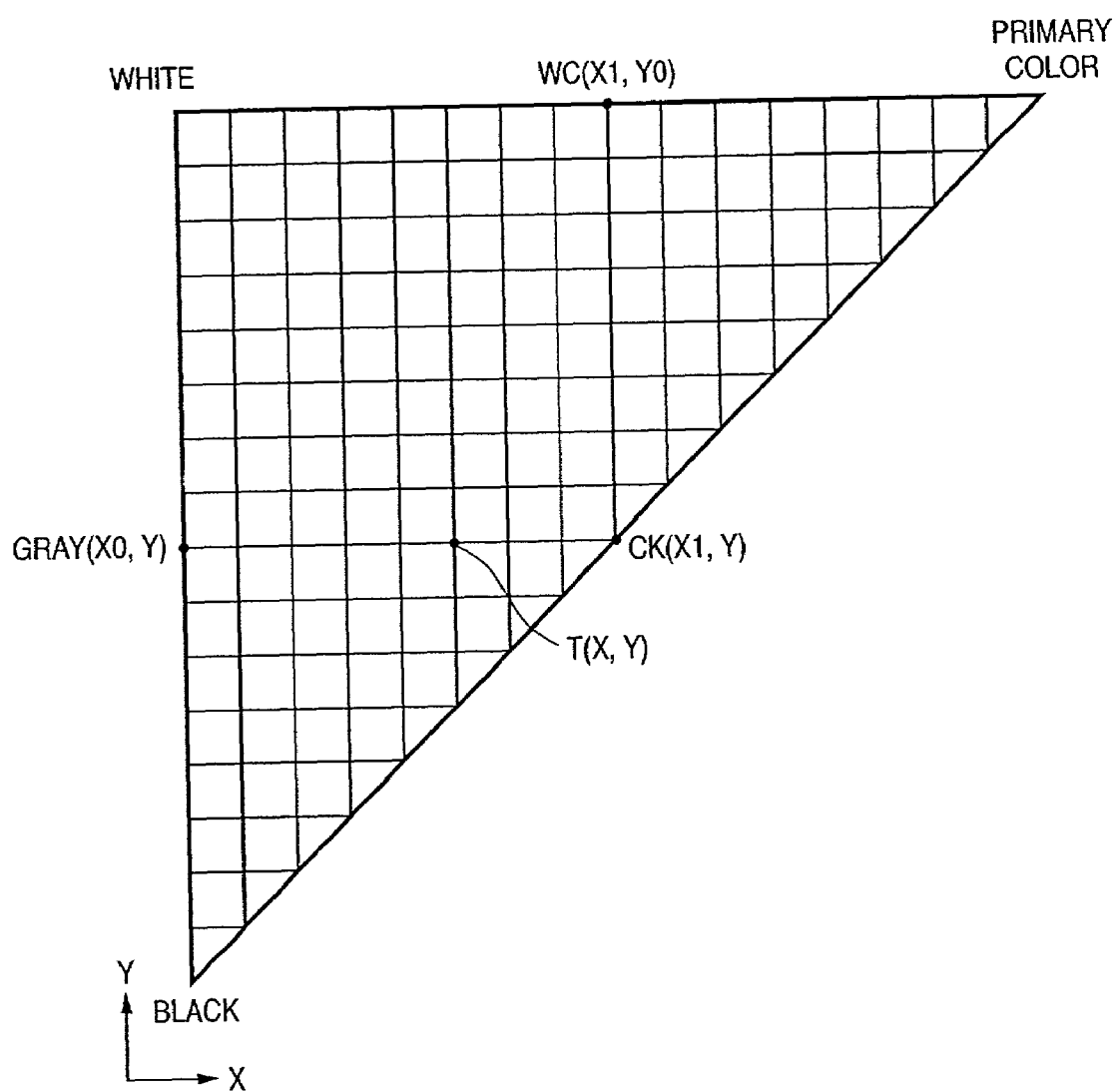
Figure 11A:
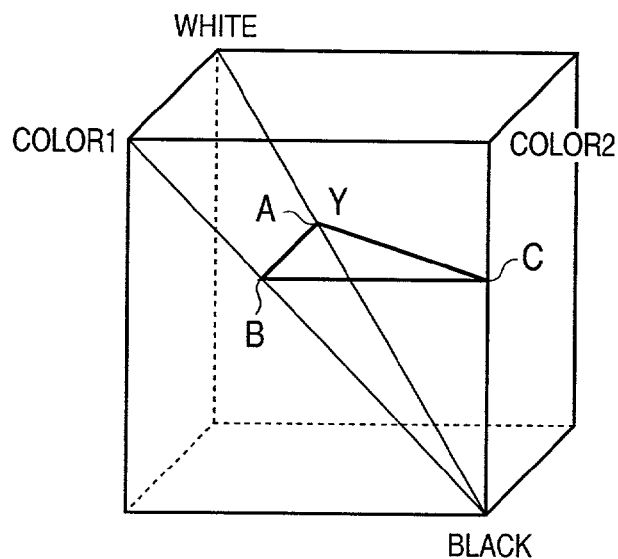
FIG. 11A is a view showing a rectangular parallelepiped representing a color space having six primary colors as its apexes.
Figure 11B:
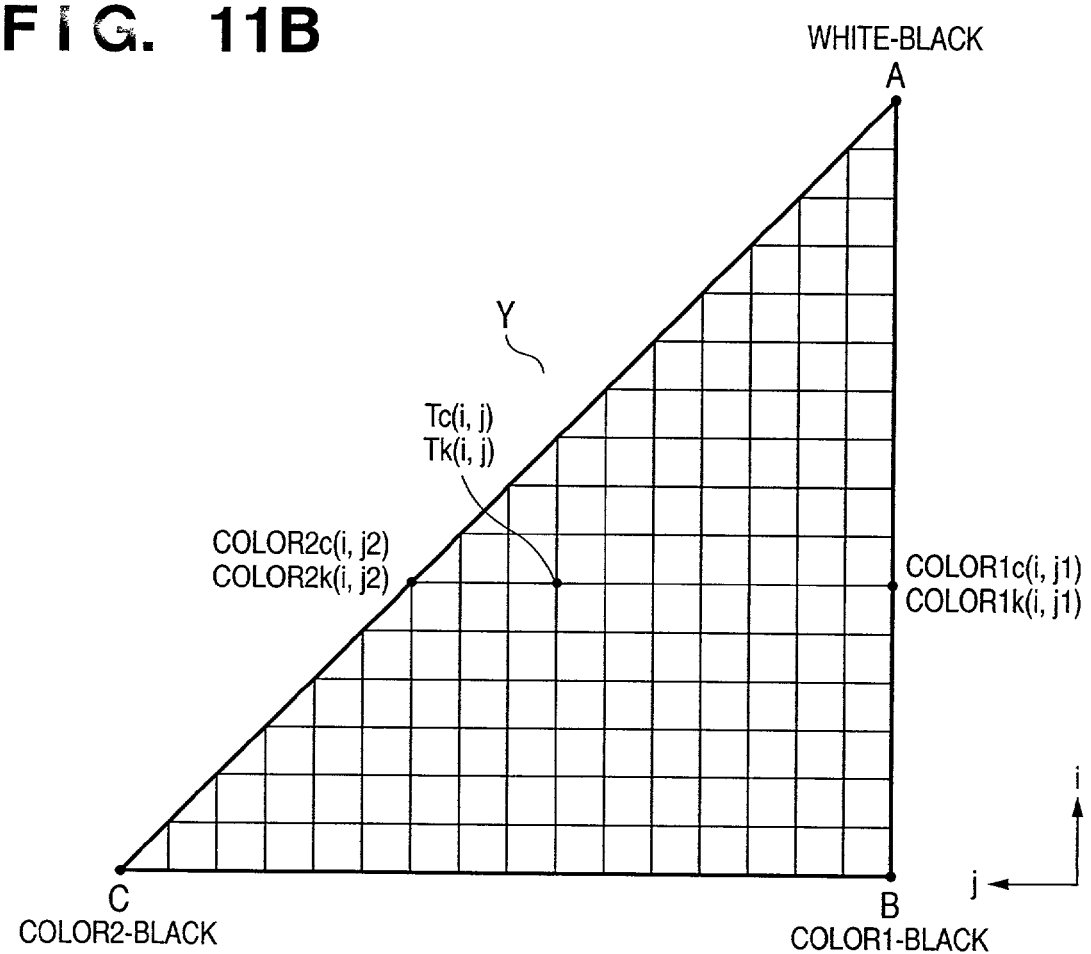
FIG. 11B is a view for explaining interpolation of signal values at lattice points on a triangular plane Y in the color space rectangular parallelepiped shown in FIG. 11A.
Figure 12:
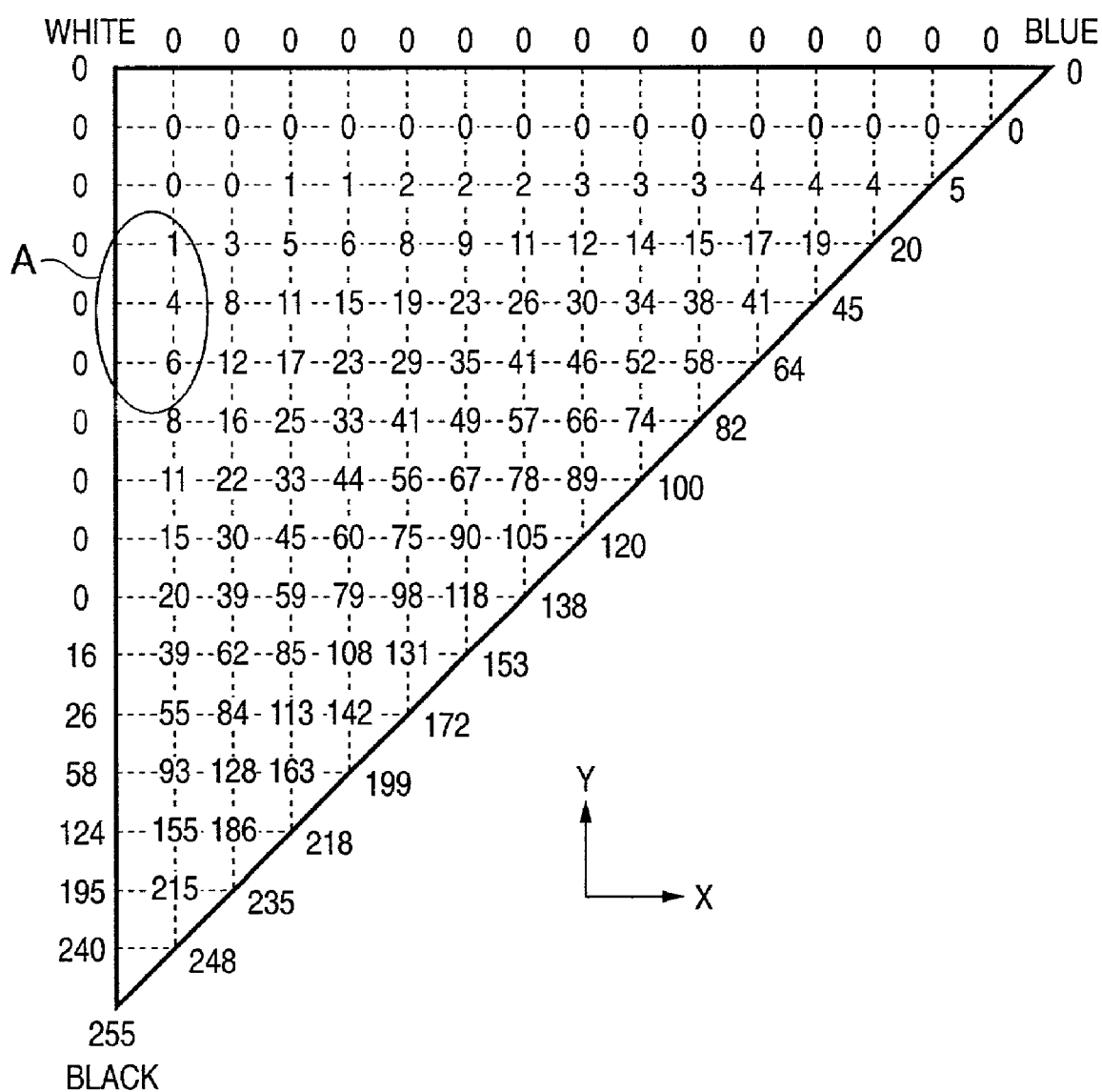
Figure 13:
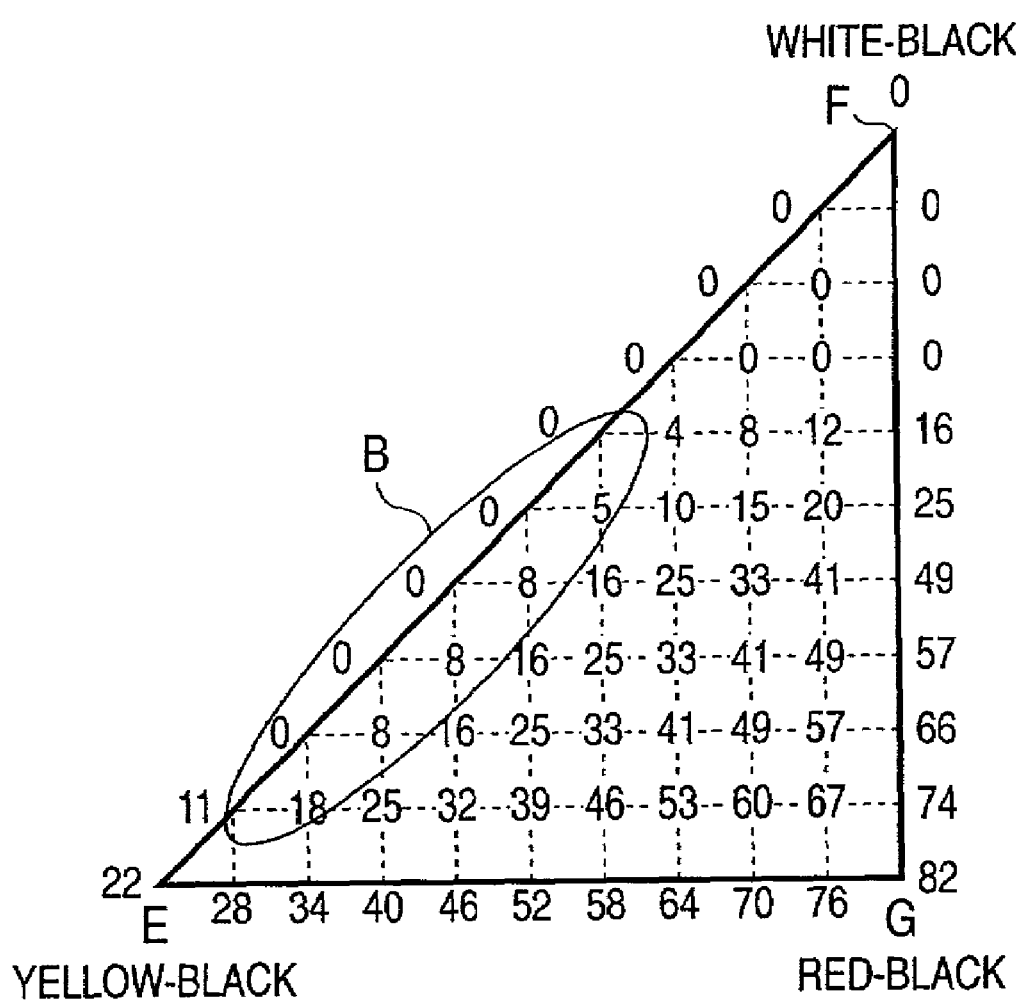
Figure 14:
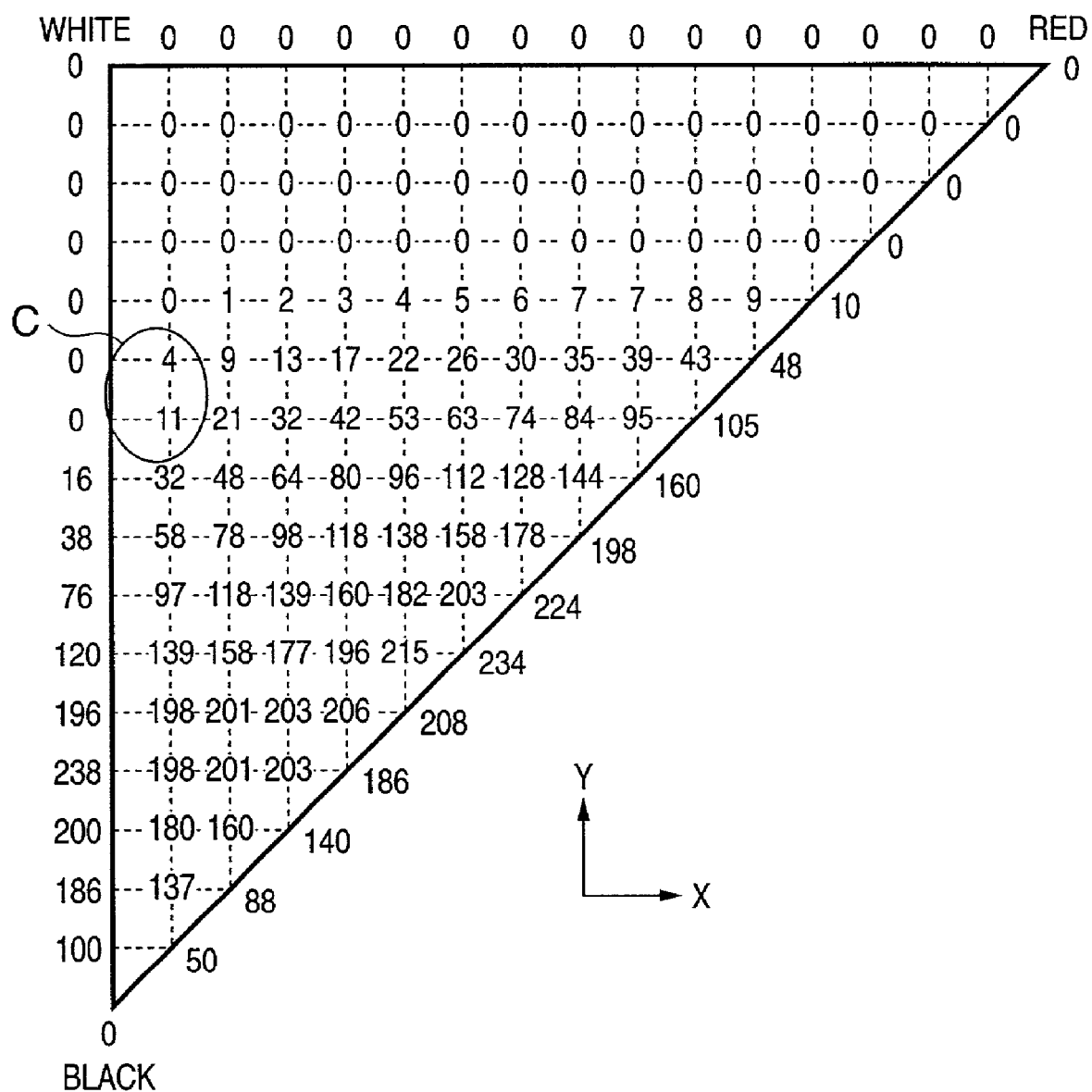
Figures 16A, 16B:
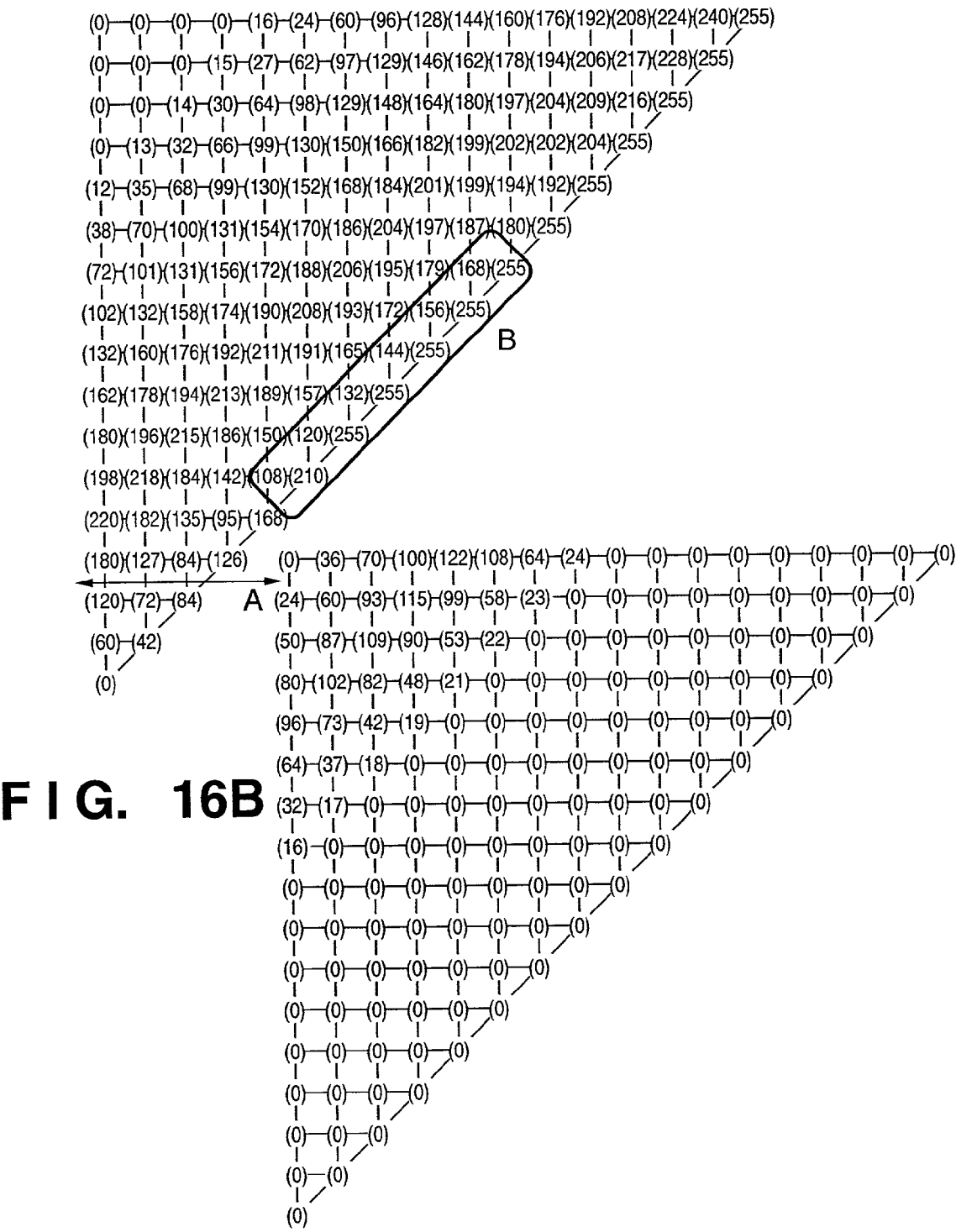
Figure 32:
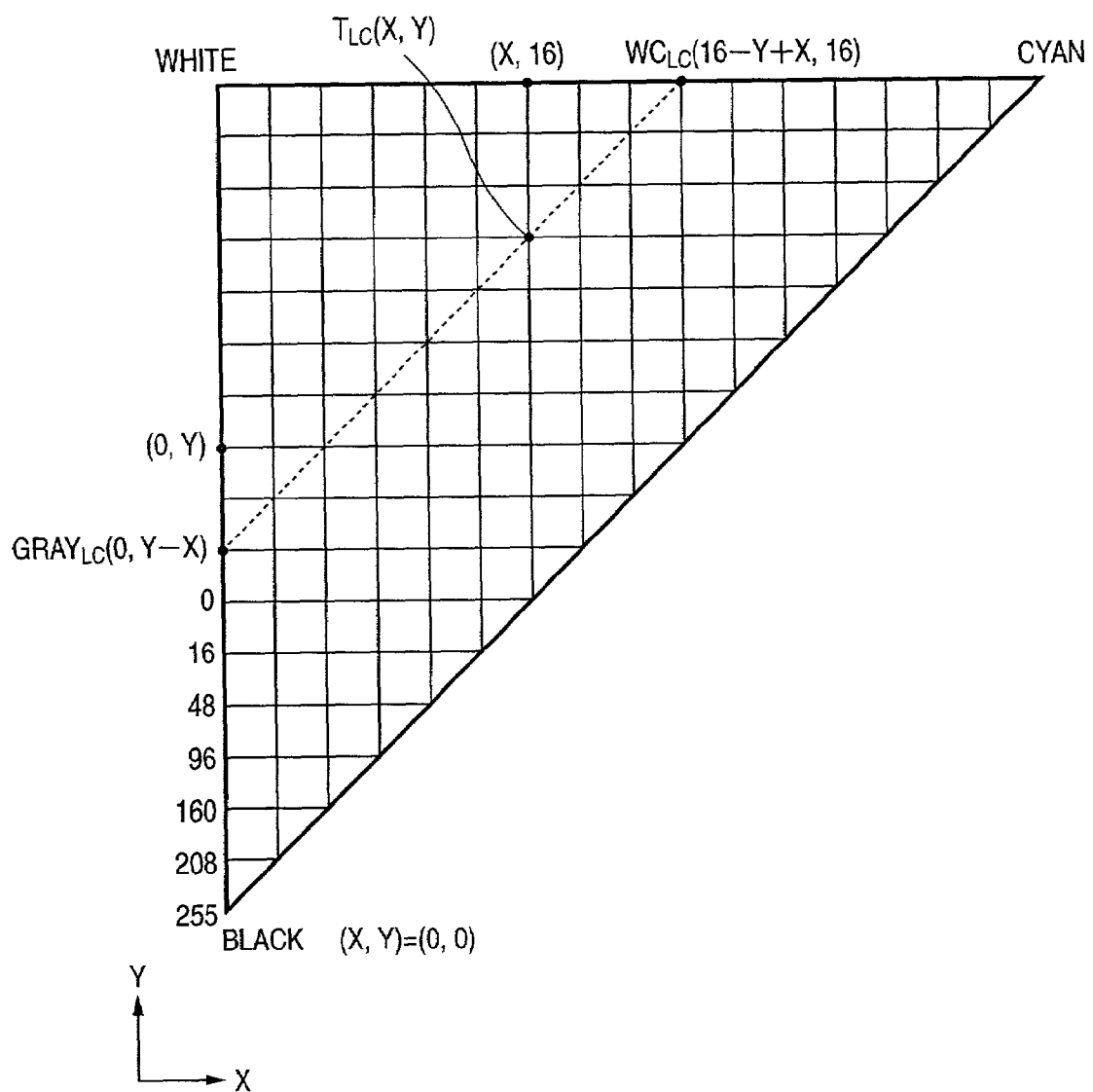
FIG. 32 is a view for explaining a method of determining LC ink signal values in a triangle of white, cyan, and black according to the third embodiment of the present invention.

First, signal values of C and LC inks as color components of cyan are determined. LC ink is linearly interpolated as indicated by E in FIG. 8 described in BACKGROUND OF THE INVENTION. X and Y axes are set as shown in FIG. 32, and black is set as an origin (0,0). Letting $T_{LC}(X,Y)$ denote the signal value of LC ink at a lattice point (X,Y) in this triangle, this $T_{LC}(X,Y)$ is calculated by $$T_{LC}(X,Y)=X\times\{WC_{LC}(16-Y+X,16)-GRAY_{LC}(0,Y-X)\}/(16-Y+X)+GRAY_{LC}(0,Y-X)$$

where $WC_{LC}(i,j)$ is the ith signal value of LC ink from white on a white-cyan line, and $GRAY_{LC}(i,j)$ is the jth signal value of LC ink from black on a gray line.

Figure 33:
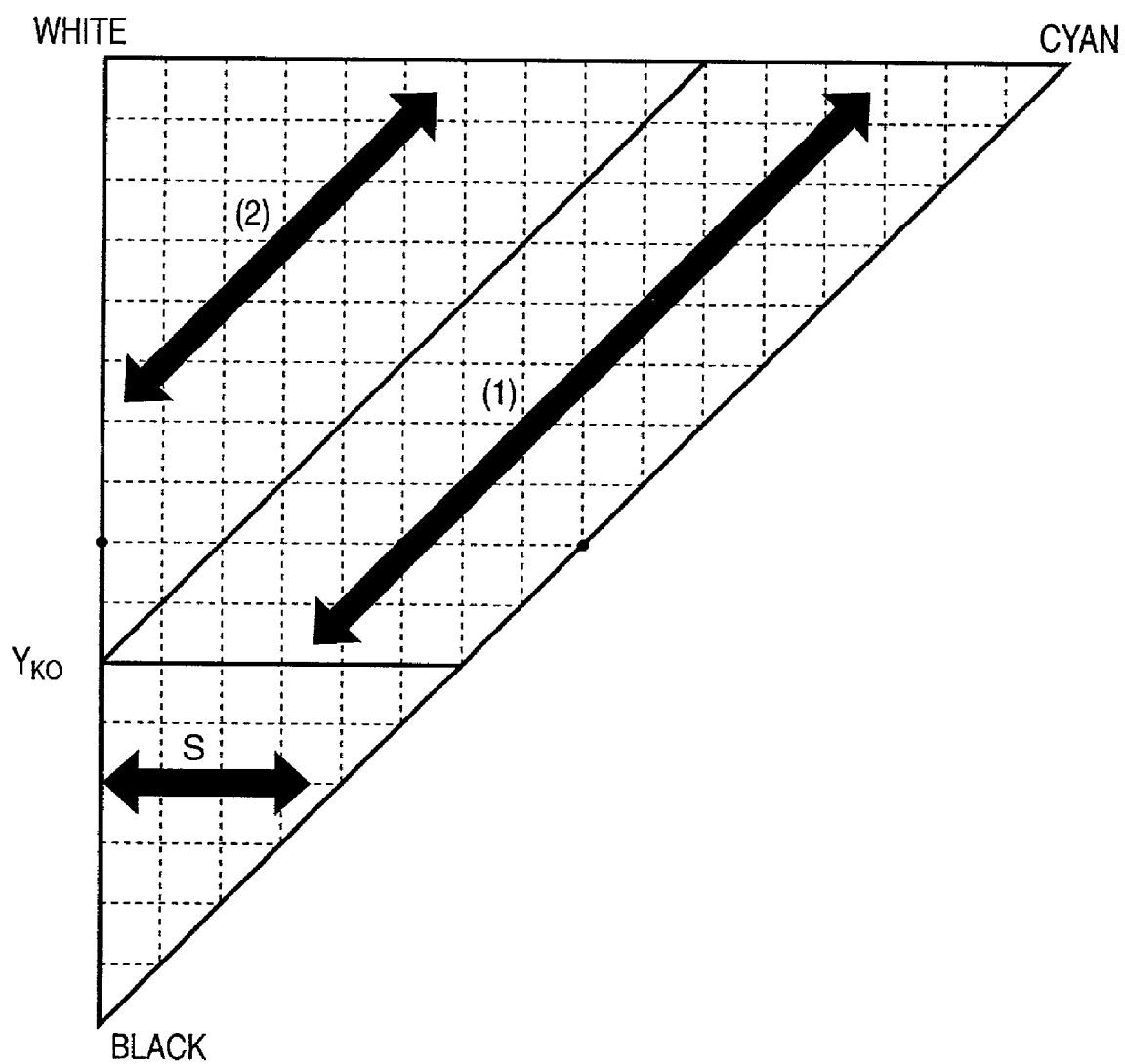
FIG. 33 is a view for explaining a method of determining C ink signal values in the triangle of white, cyan, and black according to the third embodiment of the present invention.

C ink is formed by checking the presence/absence of K ink on the gray line. Y is raised from Y=1, and $Y_{K0}$ is determined when the signal value of K ink is 0. Assuming the value described on the side of the gray line in FIG. 32 is the signal value of K ink, $Y_{K0}$=6. In a region where K ink is used on the gray line, linear interpolation as indicated by S in FIG. 33 is performed. When this is represented by an equation, a signal value $T_C(X,Y)$ of C ink is given by $$T_C(X,Y)=X\times\{CK_C(Y,Y)-GRAY_C(0,Y)\}/Y+GRAY_C(0,Y)(Y\leq Y_{K0})$$

In a region larger than $Y_{K0}$, i.e., in a region where no K ink is used on the gray line, as shown in FIG. 33, two different interpolation methods, i.e., $\hat{1}$ linear interpolation of Y=YK0 and the white-cyan line and $\hat{2}$ linear interpolation of the gray line and the white-cyan line are selectively performed.

Linear interpolation $\hat{1}$ is represented by $$T_C(X,Y)=X\times\{WC_C(16-Y+X,16)-T_C(Y_{K0}-Y+K,Y_{KC})\}/(16-Y_{K0})+T_C(Y_{K0}-Y+X,Y_{K0})\ (Y>Y_{K0})\text{ and }(Y-X\leq Y_{K0})$$

Linear interpolation $\hat{2}$ is represented by $$T_C(X,Y)=X\times\{WC_C(16-Y+X,16)-GRAY_C(Y_{K0}-Y+K,Y_{K0})\}/(16-Y_{K0})+GRAY_C(Y_{K0}-Y+X,Y_{K0})\ (Y>Y_{K0})\text{ and }(Y-X>Y_{K0})$$

In the above equations, $CK_C(i,j)$ is the i(=j)th signal value of C ink from black on the cyan-black line, $WC_C(i,j)$ is the ith signal value of C ink from white on the white-cyan line, and $GRAY_C(i,j)$ is the jth signal value of C ink from black on the gray line.

FIG. 34 shows signal values of C ink formed by this method. Neither an inflection point nor discontinuation as described in BACKGROUND OF THE INVENTION is found. Also, no small signal values which deteriorate the granularity exist in a highlight portion.

Next, M, Y, K, and LM inks as complementary color inks are processed. That is, as described in BACKGROUND OF THE INVENTION, linear interpolation is performed as indicated by D in FIG. 8. When this is represented by an equation, a signal value $T_{comp}(X,Y)$ of complementary color ink at a lattice point (X,Y) in the triangle is given by $$T_{comp}(X,Y)=X\times\{CK_{COMP}(Y,Y)-GRAY_{comp}(0,Y)\}/Y+GRAY_{comp}(0,Y)$$

where $CK_{comp}(i,j)$ is the i(=j)th signal value of complementary color ink from black on the cyan-black line, and $GRAY_{comp}(i,j)$ is the jth signal value of complementary color ink from black on the gray line.

Finally, signal values between the triangles are determined in the fifth step. These signal values are calculated using $$T(i,j)=j\times\{COLOR2(i,j2)-COLOR1(i,j1)\}/(j2-j1)+COLOR1(i,j1)$$

described in BACKGROUND OF THE INVENTION.

As described above, in the formation of a color transform LUT for transforming RGB signal values into ink colors, this embodiment provides a table formation method capable of checking the presence/absence of K ink on a gray line and thereby switching linear interpolation methods to be used. When data is printed by using this table, outputs having none of a pseudo contour, gradation discontinuation, and gradation inversion can be realized.

(Other Embodiments)

The above embodiment has been explained by taking an inkjet printer as an example of a printer. However, another printer such as an electrophotographic printer can also be used.

The objects of the present invention can also be achieved by supplying program codes of software for implementing the functions of the above embodiments to an internal computer of an apparatus or system connected to various devices so as to operate these devices to implement the functions of the embodiments, and allowing the computer (CPU or MPU) of the system or apparatus to operate the various devices in accordance with the stored program.

In this case, the program codes of the software implement the functions of the above embodiments, and the program codes themselves and means for supplying the program codes to the computer, e.g., a storage medium storing these program codes, constitute the present invention.

As this storage medium storing the program codes, it is possible to use, e.g., a floppy disk, hard disk, optical disk, magnetooptical disk, CD-ROM, magnetic tape, nonvolatile memory card, and ROM.

Furthermore, besides the functions of the above embodiments are implemented by executing the supplied program codes by the computer, the present invention includes a case where the program codes implement the functions of the embodiments in cooperation with an OS (Operating System) or another application software running on the computer.

Furthermore, the present invention also includes a case where, after the supplied program codes are written in a memory of a function extension board of the computer or of a function extension unit connected to the computer, a CPU or the like of the function extension board or function extension unit performs part or the whole of actual processing in accordance with designations by the program codes and thereby implements the functions of the above embodiments.

Also, the present invention makes it possible to form a lookup table capable of obtaining a good output image having none of a pseudo contour, gradation discontinuation, and gradation inversion.

The present invention is not limited to the above embodiments and various changes and modifications can be made within the spirit and scope of the present invention. Therefore, to apprise the public of the scope of the present invention the following claims are made.

What is claimed is:

1. A method of forming a color transform lookup table comprising:
    a step of forming a first table describing the correspondence between representative points in an input color space and output signal values when transition is from white to black;
    a step of forming a second table describing the correspondence between representative points in an input color space and output signal values when transition is from white to a first primary color;
    a step of forming a third table describing the correspondence between representative points in an input color space and output signal values when transition is from the first primary color to black;
    a first interpolation step of forming a triangular plane OPQ which has black, white, and the first primary color as apexes O, P, and Q, respectively, which represents a color space, and in which the first table corresponds to an axis PO, the second table corresponds to an axis PQ, and the third table corresponds to an axis OQ, and interpolating output signal values at lattice points when the triangular plane OPQ is divided into a lattice structure; and
    a first replacement step of dividing the triangular plane OPQ into regions by using, as a boundary, a line AB connecting a lattice point A, on the axis PO, which is before black output signal value>0 in the transition from P to O and a lattice point B, on the axis QO, which is before black output signal value>0 in the transition from Q to O, and replacing the interpolated black output signal value with 0 and the output signal value of a complementary color corresponding to the primary color with a predetermined signal value, at individual lattice points in a region in the direction of the axis PQ.

2. The method according to claim 1, further comprising:
    a step of forming a fourth table describing the correspondence between representative points in an input color space and output signal values when transition is from white to a second primary color;
    a step of forming a fifth table describing the correspondence between representative points in an input color space and output signal values when transition is from the second primary color to black;
    a second interpolation step of forming a tetrahedron OPQR which has black, white, and the first and second primary colors as apexes (O, P, Q, and R) thereof, which represents a color space, and in which the first table corresponds to an axis OP, the second table corresponds to an axis PQ, the third table corresponds to an axis QO, the fourth table corresponds to an axis PR, and the fifth table corresponds to an axis RO, and interpolating output signal values at lattice points when the tetrahedron OPQR is divided into a lattice structure; and
    a second replacement step of dividing a triangular plane P'Q'R' into regions, which is formed parallel to a triangular plane PQR as one surface of the tetrahedron OPQR, which is positioned inside the tetrahedron OPQR, and which has lattice points P', Q', and R' on axes OP, OQ, and OR, respectively, as apexes thereof, by using, as a boundary, a line DE connecting a lattice point D, on an axis P'Q', which is before black output signal value>0 in the transition from P' to Q' and a lattice point D, on an axis P'Q', which is before black output signal value>0 in the transition from P' to R', and replacing the interpolated black output signal value with 0 and the output signal values of complementary colors corresponding to the first and second primary colors with a predetermined signal value, at individual lattice points in a region in the direction of the apex P'.

3. The method according to claim 1, wherein the output signal value includes a set of C (cyan), LC (light cyan), M (magenta), LM (light magenta), Y (yellow), and K (black), and
    the method further comprises a third replacement step of
    replacing, if the complementary color replaced in the first replacement step is C, the output signal value of the complementary color C with 0 and the output signal value of LC with a predetermined signal value, and
    replacing, if the complementary color replaced in the first replacement step is M, the output signal value of the complementary color M with 0 and the output signal value of LM with a predetermined signal value.

4. The method according to claim 2, wherein the output signal value includes a set of C (cyan), LC (light cyan), M (magenta), LM (light magenta), Y (yellow), and K (black), and
    wherein the method further comprises a fourth replacement step of
    replacing, if the complementary color replaced in the second replacement step is C, the output signal value of the complementary color C with 0 and the output signal value of LC with a predetermined signal value, and
    replacing, if the complementary color replaced in the second replacement step is M, the output signal value of the complementary color M with 0 and the output signal value of LM with a predetermined signal value.

5. A computer readable storage medium storing a control program for realizing the method according to claim 1 by a computer.

6. An apparatus for forming a color transform lookup table which is looked up when input image data is to be converted into subtractive mixture image data, comprising:
    means that forms a first table describing the correspondence between representative points in an input color space and output signal values when transition is from white to black;

means that forms a second table describing the correspondence between representative points in an input color space and output signal values when transition is from white to a first primary color;

means that forms a third table describing the correspondence between representative points in an input color space and output signal values when transition is from the first primary color to black;

first interpolating means that forms a triangular plane OPQ which has black, white, and the first primary color as apexes O, P, and Q, respectively, which represents a color space, and in which the first table corresponds to an axis PO, the second table corresponds to an axis PQ, and the third table corresponds to an axis OQ, and interpolating output signal values at lattice points when the triangular plane OPQ is divided into a lattice structure; and first replacing means that divides the triangular plane OPQ into regions by using, as a boundary, a line AB connecting a lattice point A, on the axis PO, which is before black output signal value>0 in the transition from P to O and a lattice point B, on the axis QO, which is before black output signal value>0 in the transition from Q to O, and replacing the interpolated black output signal value with 0 and the output signal value of a complementary color corresponding to the primary color with a predetermined signal value, at individual lattice points in a region in the direction of the axis PQ.

7. An image processing method of forming a lookup table for transforming image data into a printing material color, comprising the steps of:

forming data on sides of a triangle representing a color space having white, black, and a primary color as apexes thereof; and forming data inside the triangle by using interpolation on the basis of the formed data on the sides of the triangle, wherein the interpolation method for a color component corresponding to the primary color belonging to the triangle is different from the interpolation method for another color component, wherein when the data inside the triangle is to be formed, a formation method is controlled for the color component corresponding to the primary color in accordance with the output signal value of black on a side from white to black.

8. The method according to claim 7, wherein the formation method is controlled by changing a method of selecting points for use in the interpolation.

9. The method according to claim 7, the formation method is controlled by changing the direction of linear interpolation.

10. The method according to claim 9, wherein the direction of linear interpolation is determined such that in a region in which the output signal value of black is 0 on the side from white to black, linear interpolation is performed in the directions of a white-black line and a white-primary color line, and in a region in which the output signal value of black is larger than 0 on the side from white to black, linear interpolation is performed in the directions of the white-black line and a primary color-black line.

11. The method according to claim 7, wherein the primary color is one of the group consisting of cyan, magenta, yellow, red, green, and blue.

12. A computer readable medium storing a program for realizing an image processing method of forming a lookup table for transforming image data into a printing material color, comprising:

a program code of the step of forming data on sides of a triangle representing a color space having white, black, and a primary color as apexes thereof; and a program code of the step of forming data inside the triangle by using interpolation on the basis of the formed data on the sides of the triangle, wherein the interpolation method for a color component corresponding to the primary color belonging to the triangle is different from the interpolation method for another color component, and wherein the step comprising, when the data inside the triangle is to be formed, controlling a formation method for the color component corresponding to the primary color in accordance with the output signal value of black on a side from white to black.

* * * * *